(12) United States Patent
Naegle et al.

(10) Patent No.: US 7,203,878 B2
(45) Date of Patent: Apr. 10, 2007

(54) SYSTEM AND METHOD FOR PERFORMING PREDICTABLE SIGNATURE ANALYSIS IN THE PRESENCE OF MULTIPLE DATA STREAMS

(75) Inventors: Nathaniel David Naegle, Pleasanton, CA (US); David W. Gibbs, Oxnard, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 544 days.

(21) Appl. No.: 10/200,054

(22) Filed: Jul. 19, 2002

(65) Prior Publication Data

US 2004/0015760 A1    Jan. 22, 2004

(51) Int. Cl.
*G01R 31/28* (2006.01)

(52) U.S. Cl. .................. 714/732; 714/39; 714/819

(58) Field of Classification Search .................. 714/30, 714/39, 726, 732, 733, 738, 711, 754, 100, 714/819, 25, 719, 31
See application file for complete search history.

(56) References Cited

U.S. PATENT DOCUMENTS

| 4,929,889 | A | | 5/1990 | Seiler et al. |
| 5,153,886 | A | | 10/1992 | Tuttle |
| 5,742,616 | A | * | 4/1998 | Torreiter et al. ............ 714/732 |
| 5,862,150 | A | | 1/1999 | Lavelle et al. |
| 5,933,594 | A | * | 8/1999 | La Joie et al. ................. 714/26 |
| 6,158,033 | A | * | 12/2000 | Wagner et al. ............... 714/726 |
| 6,163,865 | A | * | 12/2000 | Kempsey ..................... 714/733 |
| 6,374,370 | B1 | * | 4/2002 | Bockhaus et al. ............. 714/39 |
| 6,510,398 | B1 | | 1/2003 | Kundu et al. |
| 6,625,688 | B1 | | 9/2003 | Fruehling et al. |
| 6,651,196 | B1 | | 11/2003 | Iwase et al. |
| 6,819,327 | B2 | | 11/2004 | Wasserman et al. |
| 6,873,330 | B2 | | 3/2005 | Burke et al. |
| 2002/0143598 | A1 | * | 10/2002 | Scheer .......................... 705/9 |

* cited by examiner

*Primary Examiner*—Albert Decady
*Assistant Examiner*—Fritz Alphonse
(74) *Attorney, Agent, or Firm*—Meyertons Hood Kivlin Kowert & Goetzel, P.C.; Jeffrey C. Hood

(57) ABSTRACT

A computer system may include several integrated circuits and a routing circuit configured to route several data streams between the integrated circuits. The routing circuit includes several input ports, several output ports, and a signature analysis register coupled to one of the output ports. The signature analysis register is configured to collect data conveyed via the output port dependent upon whether the signature analysis register receives a tag identifying one of the plurality of data streams.

23 Claims, 18 Drawing Sheets

Sample Data to Sample Buffer 500

SYSTEM AND METHOD FOR PERFORMING PREDICTABLE SIGNATURE ANALYSIS IN THE PRESENCE OF MULTIPLE DATA STREAMS

BACKGROUND OF THE INVENTION

1. Field of the Invention

This invention relates to testing electronic systems and, more particularly, to performing signature analysis.

2. Description of the Related Art

Signature analysis is a method of hardware testing. It involves calculating the signature of a set of data according to a particular algorithm, usually after this data has passed through some hardware under test. By comparing the actual signature with a signature that is known to be correct (a "golden" signature), a pass/fail determination of the hardware under test can be made.

Signature analysis may involve creating several signature registers throughout a particular system. As data and control signals flow past each signature register, the data and control signals may be captured and combined with the signature in the signature register by applying the signature algorithm. The golden signature used to verify the signatures in the signature registers may be determined through simulation or through performing a test with a particular set of test data on a system that is known to be operating correctly.

Problems may arise during signature analysis if the data and control signals that flow past each signature register are not predictable. Since each data and control signal value may affect the signature in the signature register, unpredictable values may cause unpredictable signatures. Unpredictable signatures do not provide a useful diagnosis of the hardware under test since they may produce an incorrect signature (i.e., a signature that doesn't match the golden signature) even if the system is actually working correctly. Thus, it is desirable to be able to capture predictable signatures in systems where unpredictable data may flow past signature registers.

One situation in which signature analysis may become problematic, if not impossible, occurs when data in multiple data streams is being passed from components (e.g., integrated circuits) via a routing circuit. While each data stream may itself be deterministic, the aggregate data stream that is passed to a recipient component by the routing circuit may not be deterministic. This non-determinism may result from different propagation delays for different data streams and differences in the outcome of arbitration within a routing circuit. For example, in one test, data in one data stream may be transmitted within the routing circuit before data in another data stream. In another test, the opposite may happen. Accordingly, the aggregate data stream captured at a particular point within the system may vary between different test executions on the same system as well as between executions of the same test on different systems. It may not be possible to perform signature analysis within certain parts of the system due to the non-deterministic aggregation of several deterministic data streams.

SUMMARY

Various embodiments of a system and method for performing predictable signature analysis may involve using tags to identify different data streams. One embodiment of a computer system may include several integrated circuits and a routing circuit configured to route several data streams between the integrated circuits. The routing circuit includes several input ports, several output ports, and a signature analysis register coupled to one of the output ports. The signature analysis register is configured to collect data conveyed via the output port dependent upon whether the signature analysis register receives a tag identifying one of the plurality of data streams.

In some embodiments, a computer system may include a routing unit that includes one or more input ports and one or more output ports. In one embodiment, several deterministic data streams may be routed to respective input ports of the routing unit. The routing unit may convey the data streams to one or more of the output ports. As a result, the aggregate data streams flowing through each output port may include a non-deterministic combination of two or more of the data streams input to the routing unit. The computer system may also include a signature analysis register that is coupled to one of the routing unit's output ports. The signature analysis register is configured to collect data received by the output port for inclusion in a signature stored in the signature analysis register dependent on whether a unique tag is conveyed with the data. The unique tag is conveyed with data included in a respective data stream.

BRIEF DESCRIPTION OF THE DRAWINGS

A better understanding of the present invention can be obtained when the following detailed description is considered in conjunction with the following drawings, in which.

Figure 1:
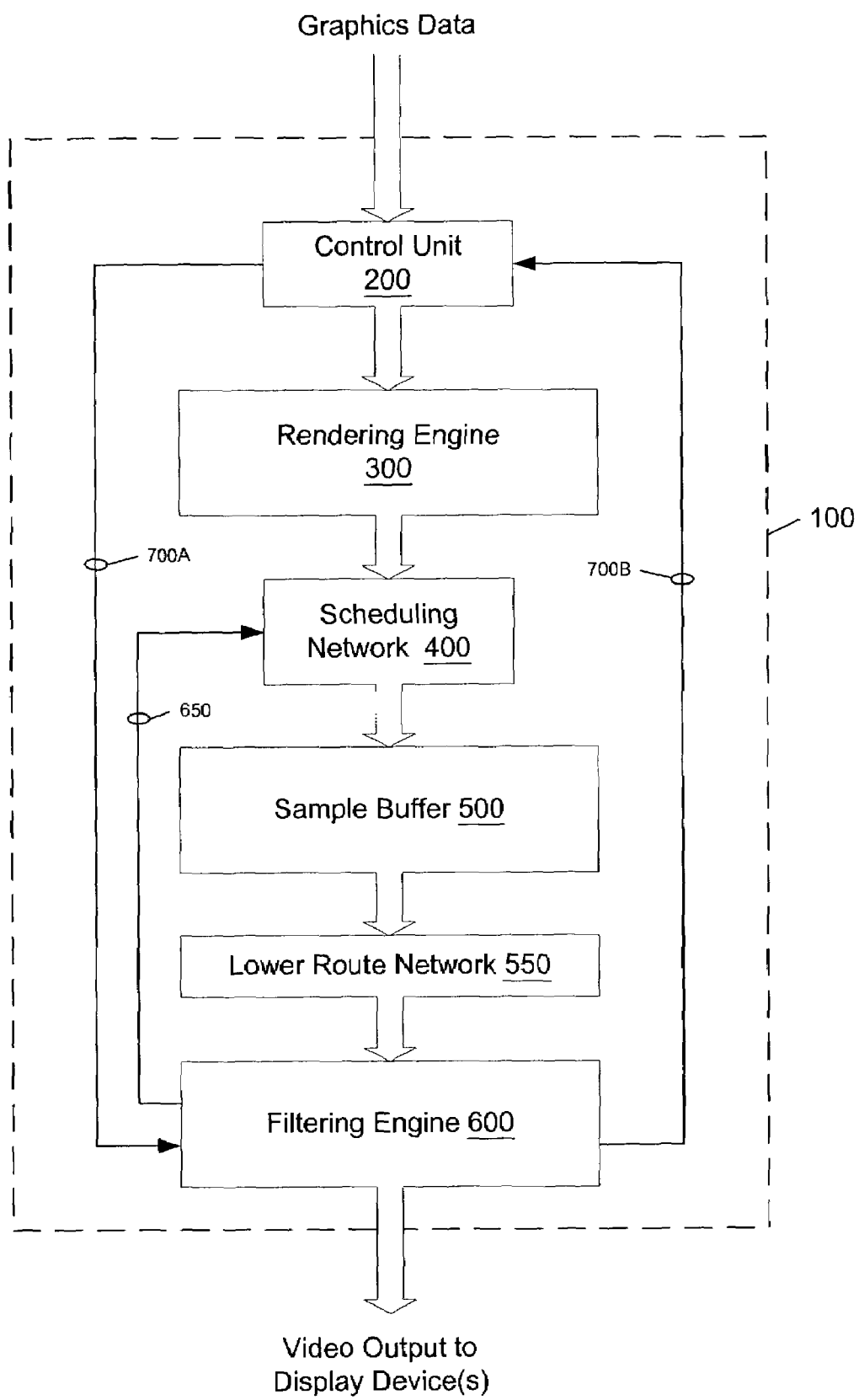
FIG. 1 illustrates one embodiment of a graphics accelerator configured to perform graphical computations.

While the invention admits various modifications and alternative forms, specific embodiments thereof are shown by way of example in the drawings and will herein be described in detail. It should be understood, however, that the drawings and detailed description thereto are not intended to limit the invention to the particular form (or forms) disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include," and derivations thereof, mean "including, but not limited to." The term "connected" means "directly or indirectly connected," and the term "coupled" means "directly or indirectly coupled."

DETAILED DESCRIPTION OF EMBODIMENTS

FIG. 1 illustrates one embodiment of a graphics accelerator 100 configured to perform graphics computations (especially 3D graphics computations). Graphics accelerator 100 may include a control unit 200, a rendering engine 300, a scheduling network 400, a sample buffer 500, a lower route network 550, and a filtering engine 600.

Figure 2:
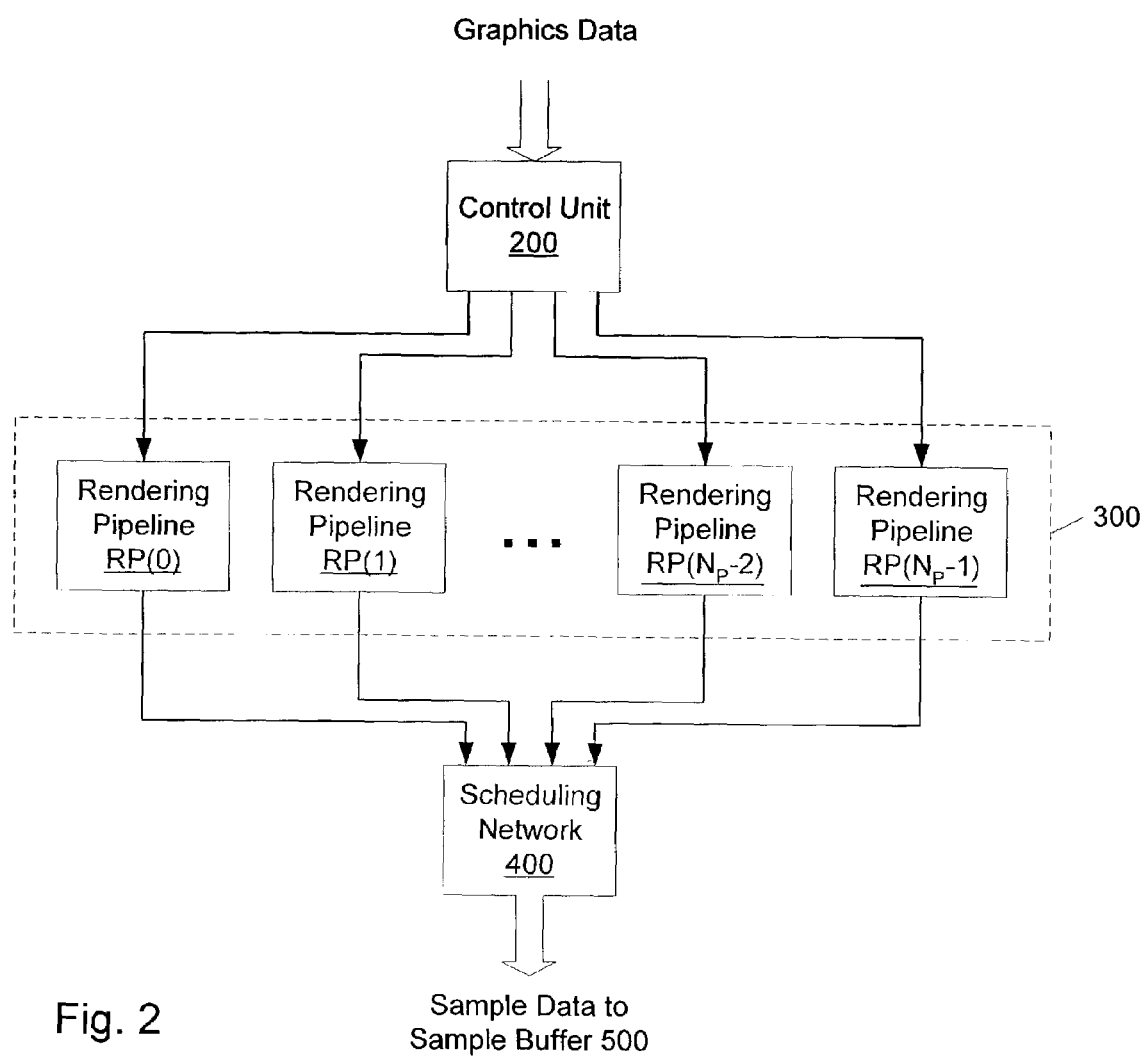
FIG. 2 illustrates one embodiment of a parallel rendering engine.

As shown in FIG. 2, the rendering engine 300 may include a set of $N_{PL}$ rendering pipelines, where $N_{PL}$ is a positive integer. The rendering pipelines, denoted as RP(0) through RP($N_{PL}$-1), may be configured to operate in parallel.

The control unit 200 receives a stream of graphics data from an external source (e.g. from the system memory of a host computer), and controls the distribution of the graphics data to the rendering pipelines. The control unit 200 may divide the graphics data stream into $N_{PL}$ (or fewer) substreams, which may respectively flow to the $N_{PL}$ rendering pipelines. The control unit 200 may implement an automatic load-balancing scheme so the host application need not concern itself with load balancing among the multiple rendering pipelines.

The stream of graphics data received by the control unit 200 may correspond to a frame of a 3D animation. The frame may include a number of 3D objects. Each object may be described by a set of primitives such as polygons (e.g., triangles), lines, polylines, dots, etc. Thus, the graphics data stream may contain information defining a set of primitives.

Polygons are naturally described in terms of their vertices. Thus, the graphics data stream may include a stream of vertex instructions. A vertex instruction may specify a position vector (X,Y,Z) for a vertex. The vertex instruction may also include one or more of: a color vector, a normal vector and a vector of texture coordinates. The vertex instructions may also include connectivity information, which allows the rendering engine 300 to assemble the vertices into polygons (e.g., triangles).

Each rendering pipeline RP(K) of the rendering engine 300 may receive a corresponding stream of graphics data from the control unit 200 and perform rendering computations on the primitives defined by the received graphics data stream. The rendering computations may generate samples, which may be written into sample buffer 500 through the scheduling network 400.

The filtering engine 600 may be configured to read samples from the sample buffer 500, to perform a filtering operation on the samples in order to generate a video pixel stream, and to convert the video pixel stream into an analog video signal. The analog video signal may be supplied to one or more video output ports for display on one or more display devices (e.g., computer monitors, projectors, head-mounted displays and televisions). Note that in some embodiments, analog to digital conversion may not be performed or may only be performed on certain video pixel streams (i.e., a digital video signal may be output to one or more display devices).

The graphics system 100 may be configured to generate up to ND independent video pixel streams denoted VPS(0), VPS(1), . . . , VPS($N_D$-1), where $N_D$ is a positive integer. Thus, a set of host applications (running on a host computer) may send $N_D$ graphics data streams denoted GDS(0), GDS(1), . . . , GDS($N_D$-1) to the graphics system 100. The rendering engine 300 may perform rendering computations on each graphics data stream GDS(I), for I=0, 1, 2, . . . , $N_D$-1, resulting in sample updates to a corresponding region SBR(I) of the sample buffer 500. The filtering engine 600 may operate on the samples from each sample buffer region SBR(I) to generate the corresponding video pixel stream VPS(I). The filtering engine 600 may convert one or more of the video pixel streams into a corresponding analog video signal. The video signals (analog and/or digital) may be supplied to a set of video output ports for display on a corresponding set of display devices.

The filtering engine 600 may send sample data requests to the scheduling network 400 through a request bus 650. In response to the sample data requests, scheduling network 400 may assert control signals that initiate the transfer of the requested samples (or groups of samples) to the filtering engine 600.

In some embodiments, the sample buffer 500 may include several memory units, and the filtering engine 600 may include several filtering units. The filtering units may provide data select signals to the lower route network 550. In response to the data select signals, the lower route network 550 may steer data from the memory units to the filtering units.

The control unit 200 may couple to the filtering engine 600 through a communication bus 700, which may include an outgoing segment 700A and a return segment 700B. The outgoing segment 700A may be used to download parameters (e.g., lookup table values) to the filtering engine 600. The return segment 700B may be used as a readback path for the video pixels generated by filtering engine 600. Video pixels transferred to control unit 200 through the return segment 700B may be forwarded to system memory of a host computer or to memory (e.g., texture memory) residing on graphics system 100 or on another graphics accelerator.

The control unit 200 may include direct memory access (DMA) or other bus mastering circuitry. The bus mastering circuitry may be used to facilitate the transfer of graphics data from system memory to the control unit 200 and/or the transfer of video pixels (received from the filtering engine 600 through the return segment 700B) to any of various destinations (e.g., the system memory of the host computer).

Figure 3:
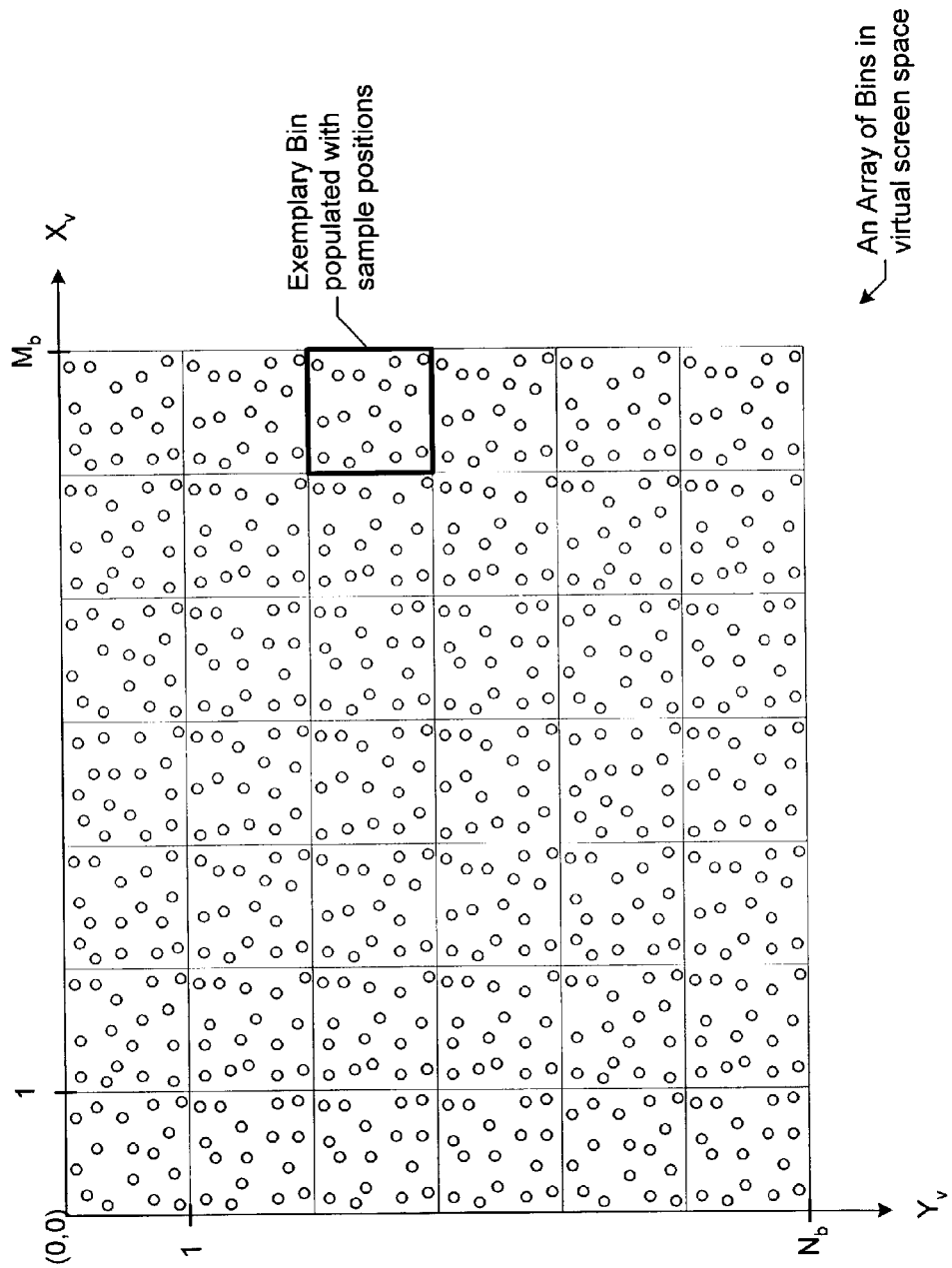
FIG. 3 illustrates an array of spatial bins each populated with a set of sample positions in a two-dimension virtual screen space.

The rendering pipelines of the rendering engine 300 may compute samples for the primitives defined by the received graphics data stream(s). The computation of samples may be organized according to an array of spatial bins, as shown in FIG. 3. In the embodiment of FIG. 3, the array of spatial bins defines a rectangular window in a virtual screen space. The spatial bin array may have dimension $M_B \times N_B$ (i.e., the spatial bin array may include $M_B$ bins horizontally and $N_B$ bins vertically).

Each spatial bin may be populated with a number of sample positions. Sample positions are denoted as small circles in FIG. 3. Each sample position may be defined by a horizontal offset and a vertical offset with respect to the origin of the bin in which it resides. The origin of a bin may be the bin's top-left corner. Note that any of a variety of other positions on the boundary or in the interior of a bin may serve as its origin. A sample may be computed at each of the sample positions. A sample may include a color vector and other values such as z depth and transparency (i.e., an alpha value).

The sample buffer 500 may organize the storage of samples according to memory bins. Each memory bin corresponds to one of the spatial bins and stores the samples for the sample positions in a corresponding spatial bin.

If a rendering pipeline RP(k) determines that a spatial bin intersects with a given primitive (e.g., triangle), the rendering pipeline may:

(a) generate $N_{s/b}$ sample positions in the spatial bin;
(b) determine which of the $N_{s/b}$ sample positions reside interior to the primitive;
(c) compute a sample for each of the interior sample positions; and
(d) forward the computed samples to the scheduling network 400 for transfer to the sample buffer 500.

The computation of a sample at a given sample position may involve computing sample components such as red, green, blue, z, and alpha at the sample position. Each sample component may be computed based on a spatial interpolation of the corresponding components at the vertices of the primitive. For example, a sample's red component may be computed based on a spatial interpolation of the red components at the vertices of the primitive.

In addition, if the primitive is to be textured, one or more texture values may be computed for the intersecting bin. The final color components of a sample may be determined by combining the sample's interpolated color components and the one or more texture values.

Each rendering pipeline RP(K) may include dedicated circuitry for determining if a spatial bin intersects a given primitive, for performing (a), (b), and (c), for computing the one or more texture values, and for applying the one or more texture values to the samples.

Each rendering pipeline RP(K) may include programmable registers for the bin array size parameters $M_B$ and $N_B$ and the sample density parameter $N_{s/b}$. In one embodiment, $N_{s/b}$ may take values in the range from 1 to 16 inclusive.

Sample Rendering Methodology

Figure 4:
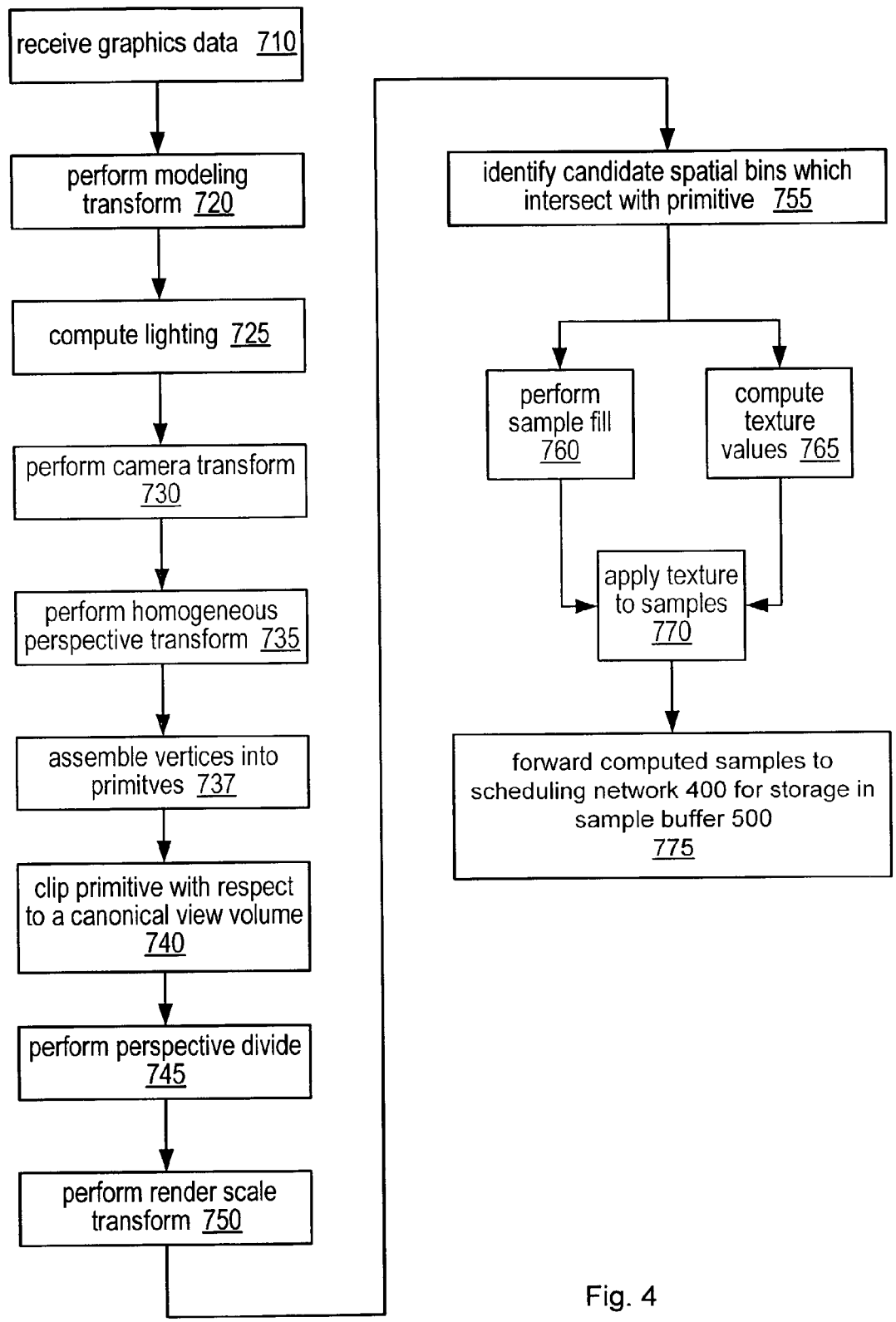
FIG. 4 illustrates one embodiment of a rendering methodology that may be used to generate samples in response to received stream of graphics data.

FIG. 4 illustrates one set of embodiments of a rendering process implemented by each rendering pipeline RP(K) of the $N_{PL}$ rendering pipelines.

At 710, rendering pipeline RP(K) receives a stream of graphics data from the control unit 200. The rendering pipeline RP(K) may store the received graphics data in an input buffer.

The graphics data may have been compressed according to any of a variety of data compression and/or geometry compression techniques. Thus, the rendering pipeline RP(K) may decompress the graphics data to recover a stream of vertices.

At 720, the rendering pipeline RP(K) may perform a modeling transformation on the stream of vertices. The modeling transformation serves to inject objects into a world coordinate system. The modeling transformation may also involve the transformation of any normal vectors associated with the stream vertices. The matrix used to perform the modeling transformation may be dynamically programmable by host software.

At 725, rendering engine 300 may subject the stream vertices to a lighting computation. Lighting intensity values (e.g., color intensity values) may be computed for the vertices of polygonal primitives based on one or more of the following:

(1) the vertex normals;
(2) the position and orientation of a virtual camera in the world coordinate system;
(3) the intensity, position, orientation and type-classification of light sources; and
(4) the material properties of the polygonal primitives such as their intrinsic color values, ambient, diffuse, and/or specular reflection coefficients.

The vertex normals (or changes in normals from one vertex to the next) may be provided as part of the graphics data stream. The rendering pipeline RP(K) may implement any of a wide variety of lighting models. The position and orientation of the virtual camera may be dynamically adjustable. Furthermore, the intensity, position, orientation, and type-classification of light sources may be dynamically adjustable.

It is noted that separate virtual camera positions may be maintained (e.g., for the viewer's left and right eyes in order to support stereo video). A rendering pipeline RP(K) may alternate between one camera position and another camera position from one animation frame to the next.

At 730, the rendering pipeline RP(K) may perform a camera transformation on the vertices of the primitive. The camera transformation may be interpreted as providing the coordinates of the vertices with respect to a camera coordinate system, which is rigidly bound to the virtual camera in the world space. Thus, the camera transformation may require updating whenever the camera position and/or orientation change. The virtual camera position and/or orientation may be controlled by user actions such as manipulations of an input device (such as a joystick, data glove, mouse, light pen, and/or keyboard). In some embodiments, the virtual camera position and/or orientation may be controlled based on measurements of a user's head position and/or orientation and/or eye orientation(s).

At 735, the rendering pipeline RP(K) may perform a homogenous perspective transformation to map primitives from the camera coordinate system into a clipping space, which is more convenient for a subsequent clipping computation. In some embodiments, functions 730 and 735 may be combined into a single transformation.

At 737, rendering pipeline RP(K) may assemble the vertices to form primitives such as triangles, lines, etc.

At 740, rendering pipeline RP(K) may perform a clipping computation on each primitive. In clipping space, the vertices of primitives may be represented as 4-tuples (X,Y,Z,W). In some embodiments, the clipping computation may be implemented by performing a series of inequality tests as follows:

T1=(-W≦X)

$T2 = (X \leq W)$
$T3 = (-W \leq Y)$
$T4 = (Y \leq W)$
$T5 = (-W \leq Z)$
$T6 = (Z \leq 0)$ If all the test flags are true, a vertex resides inside the canonical view volume. If any of the test flags are false, the vertex is outside the canonical view volume. An edge between vertices A and B is inside the canonical view volume if both vertices are inside the canonical view volume. An edge can be trivially rejected if the expression Tk(A) OR Tk(B) is false for any k in the range from one to six. Otherwise, the edge requires testing to determine if it partially intersects the canonical view volume, and if so, to determine the points of intersection of the edge with the clipping planes. A primitive may thus be cut down to one or more interior sub-primitives (i.e., subprimitives that lie inside the canonical view volume). The rendering pipeline RP(K) may compute color intensity values for the new vertices generated by clipping.

Note that the example given above for performing the clipping computation is not meant to be limiting. Other methods may be used for performing the clipping computation.

At 745, rendering pipeline RP(K) may perform a perspective divide computation on the homogenous post-clipping vertices (X,Y,Z,W) according to the relations $x = X/W$
$y = Y/W$
$z = Z/W$.

After the perspective divide, the x and y coordinates of each vertex (x,y,z) may reside in a viewport rectangle, for example, a viewport square defined by the inequalities $-1 \leq x \leq 1$ and $-1 \leq y \leq 1$.

At 750, the rendering pipeline RP(K) may perform a render scale transformation on the post-clipping primitives. The render scale transformation may operate on the x and y coordinates of vertices, and may have the effect of mapping the viewport square in perspective-divided space onto (or into) the spatial bin array in virtual screen space, i.e., onto (or into) a rectangle whose width equals the array horizontal bin resolution $M_B$ and whose height equals the array vertical bin resolution $N_B$. Let $X_V$ and $Y_V$ denote the horizontal and vertical coordinate respectively in the virtual screen space.

Figure 5:
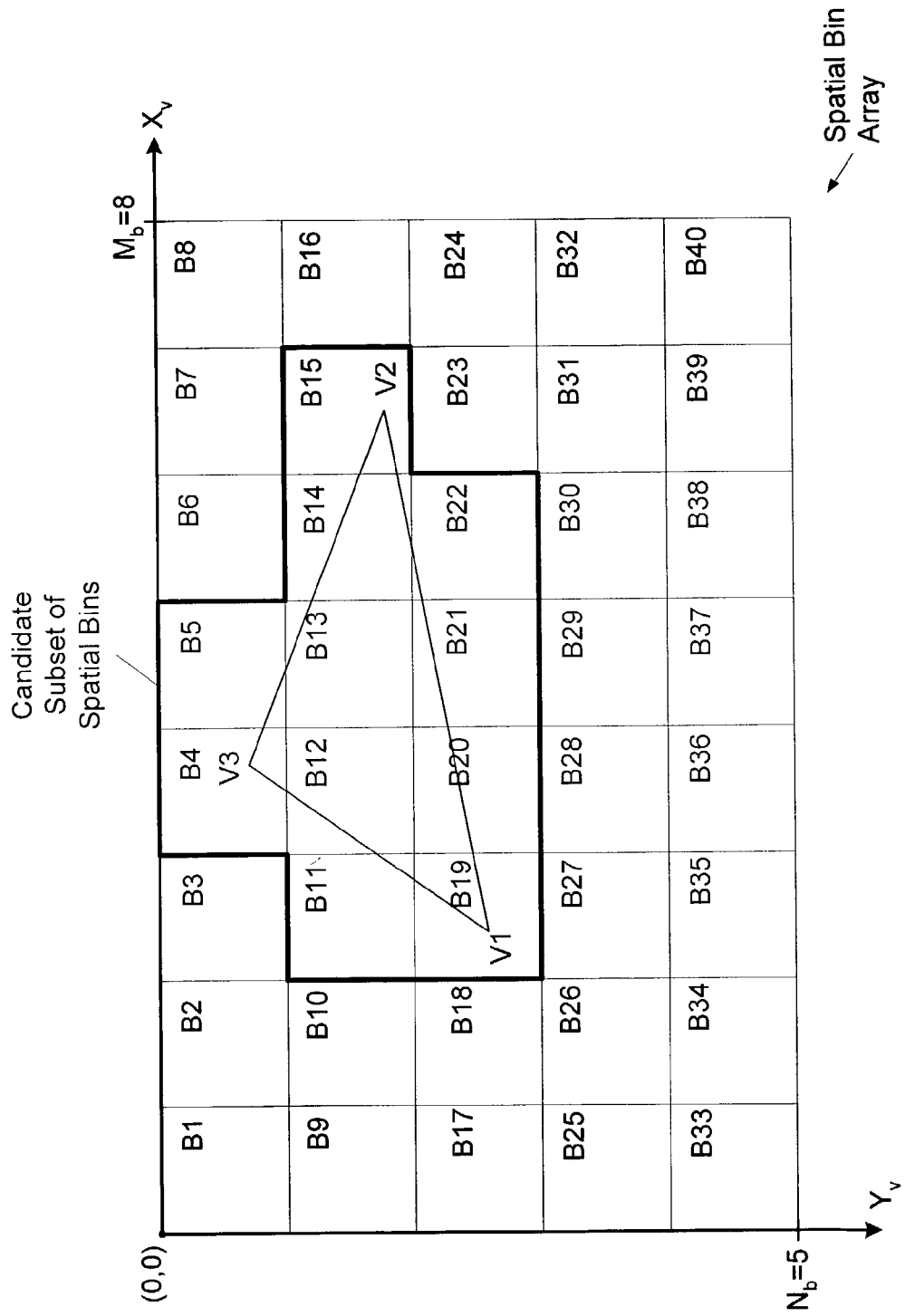
FIG. 5 illustrates a set of candidate bins that intersect a particular triangle.

At 755, the rendering pipeline RP(K) may identify spatial bins which geometrically intersect with the post-scaling primitive as suggested by FIG. 5. Bins in this subset are referred to as "candidate" bins or "intersecting" bins. It is noted that values $M_B=8$ and $N_B=5$ for the dimensions of the spatial bin array have been chosen for sake of illustration and are much smaller than would typically be used in most applications of graphics system 100.

Figure 6:
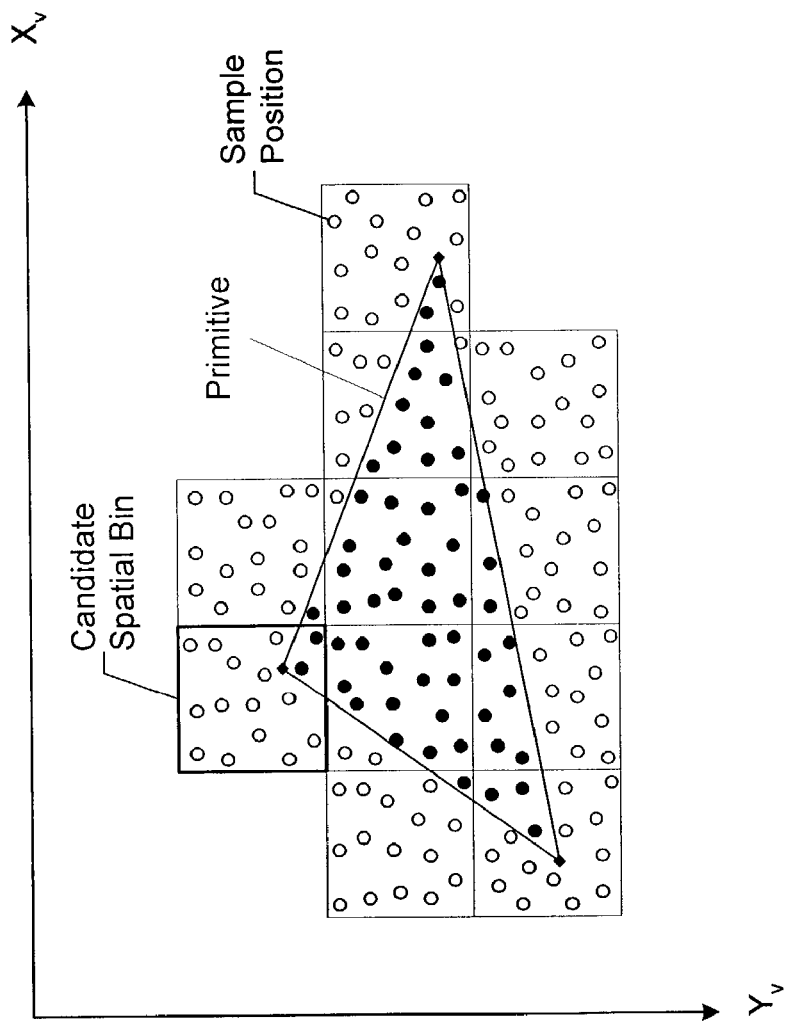
FIG. 6 illustrates the identification of sample positions in the candidate bins that fall interior to the triangle.

At 760, the rendering pipeline RP(K) performs a "sample fill" operation on candidate bins identified at 755 as suggested by FIG. 6. In the sample fill operation, the rendering pipeline RP(K) populates candidate bins with sample positions, identifies which of the sample positions reside interior to the primitive, and computes sample values (such as red, green, blue, z and alpha) at each of the interior sample positions. The rendering pipeline RP(K) may include several sample fill units to parallelize the sample fill computation. For example, two sample fill units may perform the sample fill operation in parallel on two candidate bins respectively. This N=2 example generalizes to any number of parallel sample fill units. In FIG. 6, interior sample positions are denoted as small black dots, and exterior sample positions are denoted as small circles.

Figure 7:
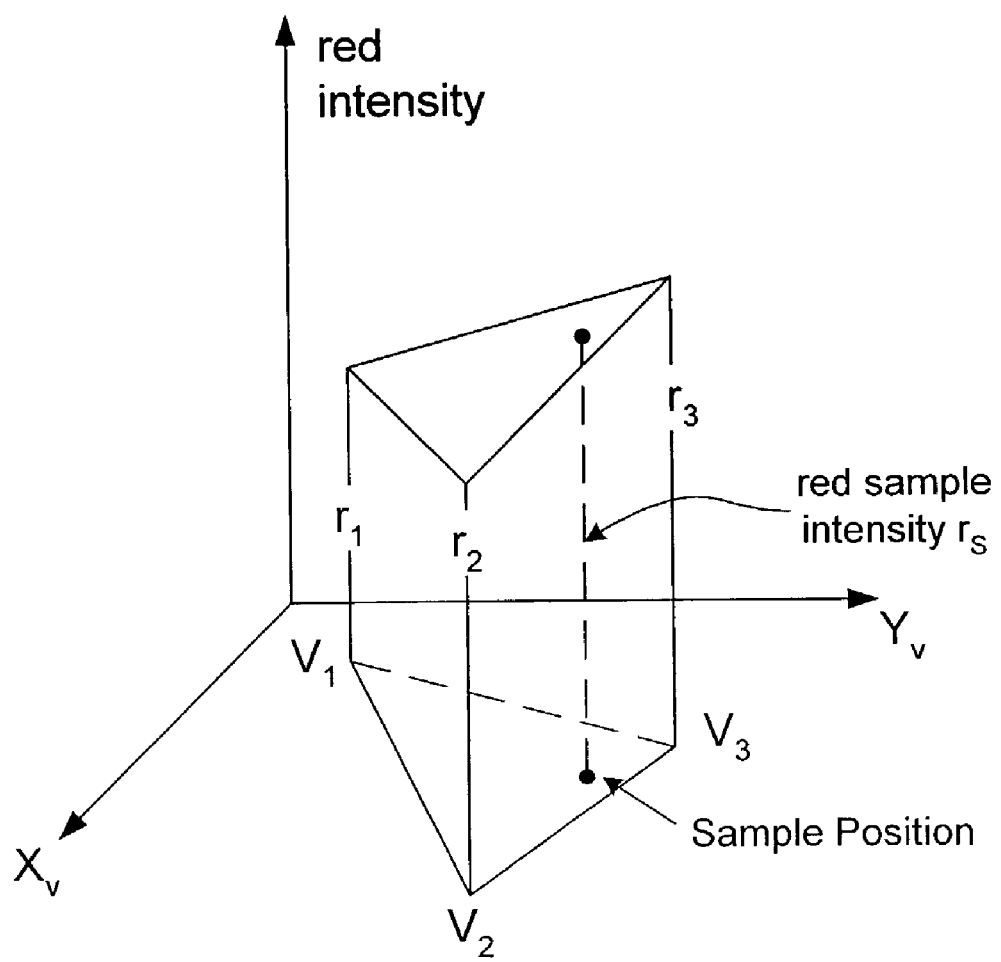
FIG. 7 illustrates the computation of a red sample component based on a spatial interpolation of the red components at the vertices of the containing triangle.

The rendering pipeline RP(K) may compute the color components (r,g,b) for each interior sample position in a candidate bin based on a spatial interpolation of the corresponding vertex color components, as shown in FIG. 7. FIG. 7 shows a linear interpolation of a red intensity value $r_s$ for a sample position inside the triangle defined by the vertices V1, V2, and V3 in virtual screen space (i.e., the horizontal plane of the figure). The red color intensity is shown as the up-down coordinate. Each vertex Vk has a corresponding red intensity value $r_k$. Similar interpolations may be performed to determine green, blue, z, and alpha values.

At 765, rendering pipeline RP(K) may compute a vector of texture values for each candidate bin. The rendering pipeline RP(K) may couple to a corresponding texture memory TM(K). The texture memory TM(K) may be used to store one or more layers of texture information. Rendering pipeline RP(K) may use texture coordinates associated with a candidate bin to read texels from the texture memory TM(K). The texels may be filtered to generate the vector of texture values. The rendering pipeline RP(K) may include several texture filtering units to parallelize the computation of texture values for one or more candidate bins.

The rendering pipeline RP(K) may include a sample fill pipeline that implements function 760 and a texture pipeline that implements function 765. The sample fill pipeline and the texture pipeline may be configured for parallel operation. The sample fill pipeline may perform the sample fill operations on one or more candidate bins while the texture fill pipeline computes the texture values for the one or more candidate bins.

At 770, the rendering pipeline RP(K) may apply the one or more texture values corresponding to each candidate bin to the color vectors of the interior samples in the candidate bin. Any of a variety of methods may be used to apply the texture values to the sample color vectors.

At 775, the rendering pipeline RP(K) may forward the computed samples to the scheduling network 400 for storage in the sample buffer 500.

The sample buffer 500 may be configured to support double-buffered operation. The sample buffer may be logically partitioned into two buffer segments A and B. The rendering engine 300 may write into buffer segment A while the filtering engine 600 reads from buffer segment B. At the end of a frame of animation, a host application (running on a host computer) may assert a buffer swap command. In response to the buffer swap command, control of buffer segment A may be transferred to the filtering engine 600, and control of buffer segment B may be transferred to rendering engine 300. Thus, the rendering engine 300 may start writing samples into buffer segment B, and the filtering engine 600 may start reading samples from buffer segment A.

It is noted that usage of the term "double-buffered" does not necessarily imply that all components of samples are double-buffered in the sample buffer 500. For example, sample color may be double-buffered while other components such as z depth may be single-buffered.

In some embodiments, the sample buffer 500 may be triple-buffered or N-fold buffered, where N is greater than two.

Filtration of Samples to Determine Pixels

Filtering engine 600 may access samples from a buffer segment (A or B) of the sample buffer 500 and generate video pixels from the samples. Each buffer segment of sample buffer 500 may be configured to store an $M_B \times N_B$ array of bins. Each bin may store $N_{s/b}$ samples. The values $M_B$, $N_B$ and $N_{s/b}$ may be programmable parameters.

Figure 8:
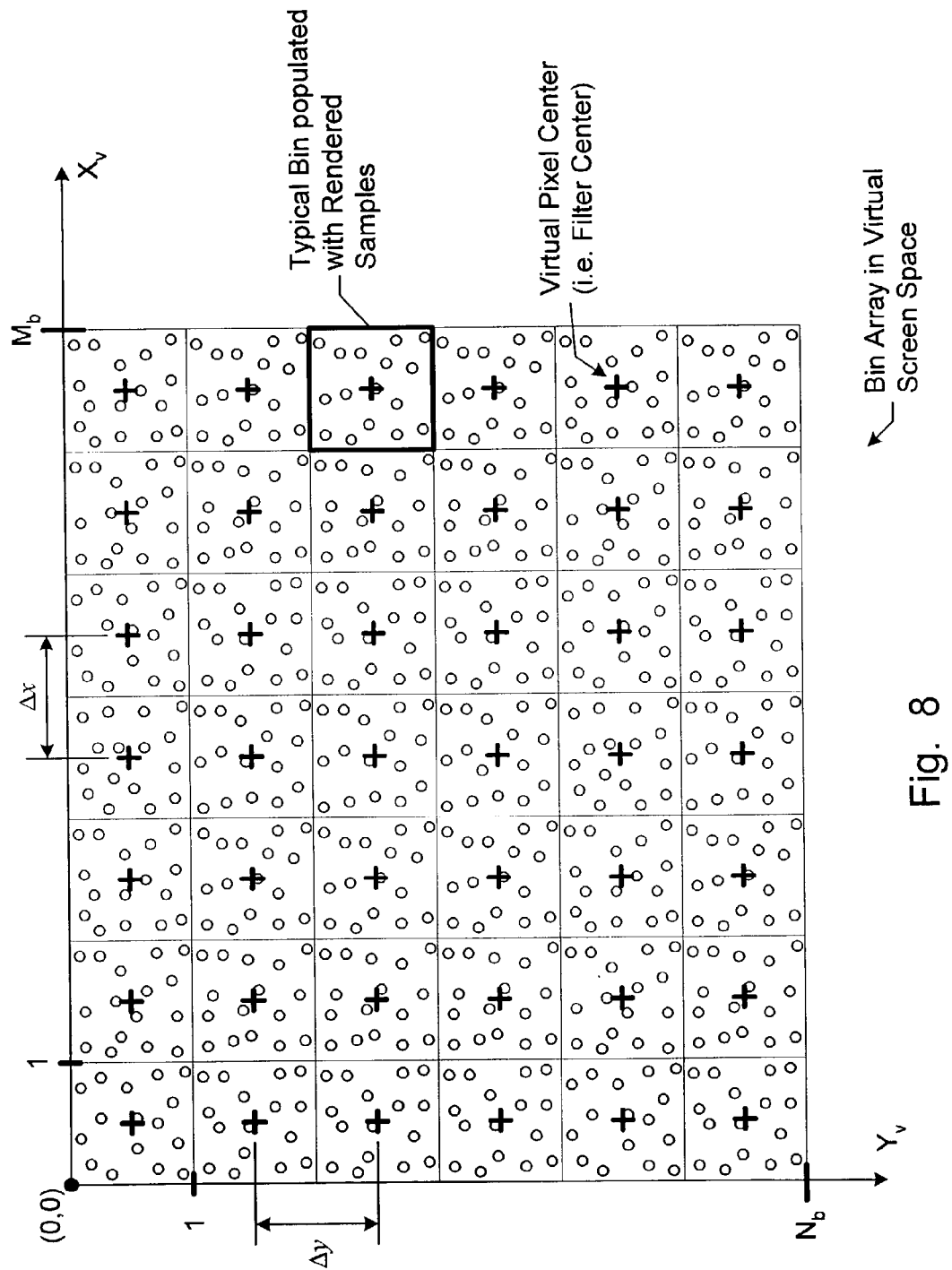
FIG. 8 illustrates an array of virtual pixel positions distributed in the virtual screen space and superimposed on top of the array of spatial bins.

As suggested by FIG. 8, filtering engine 600 may scan through virtual screen space in raster fashion generating virtual pixel positions denoted by the small plus markers and generating a video pixel at each of the virtual pixel positions based on the samples (small circles) in the neighborhood of the virtual pixel position. The virtual pixel positions are also referred to herein as filter centers (or kernel centers) since the video pixels are computed by means of a filtering of samples. The virtual pixel positions form an array with horizontal displacement $\Delta X$ between successive virtual pixel positions in a row and vertical displacement $\Delta Y$ between successive rows. The first virtual pixel position in the first row is controlled by a start position $(X_{start}, Y_{start})$. The horizontal displacement $\Delta X$, vertical displacement $\Delta Y$ and the start coordinates $X_{start}$ and $Y_{start}$ are programmable parameters.

FIG. 8 illustrates a virtual pixel position at the center of each bin. However, this arrangement of the virtual pixel positions (at the centers of render pixels) is a special case. More generally, the horizontal displacement $\Delta x$ and vertical displacement $\Delta y$ may be assigned values greater than or less than one. Furthermore, the start position $(X_{start}, Y_{start})$ is not constrained to lie at the center of a spatial bin. Thus, the vertical resolution $N_P$ of the array of virtual pixel centers may be different from $N_B$, and the horizontal resolution $M_P$ of the array of virtual pixel centers may be different from $M_B$.

Figure 9:
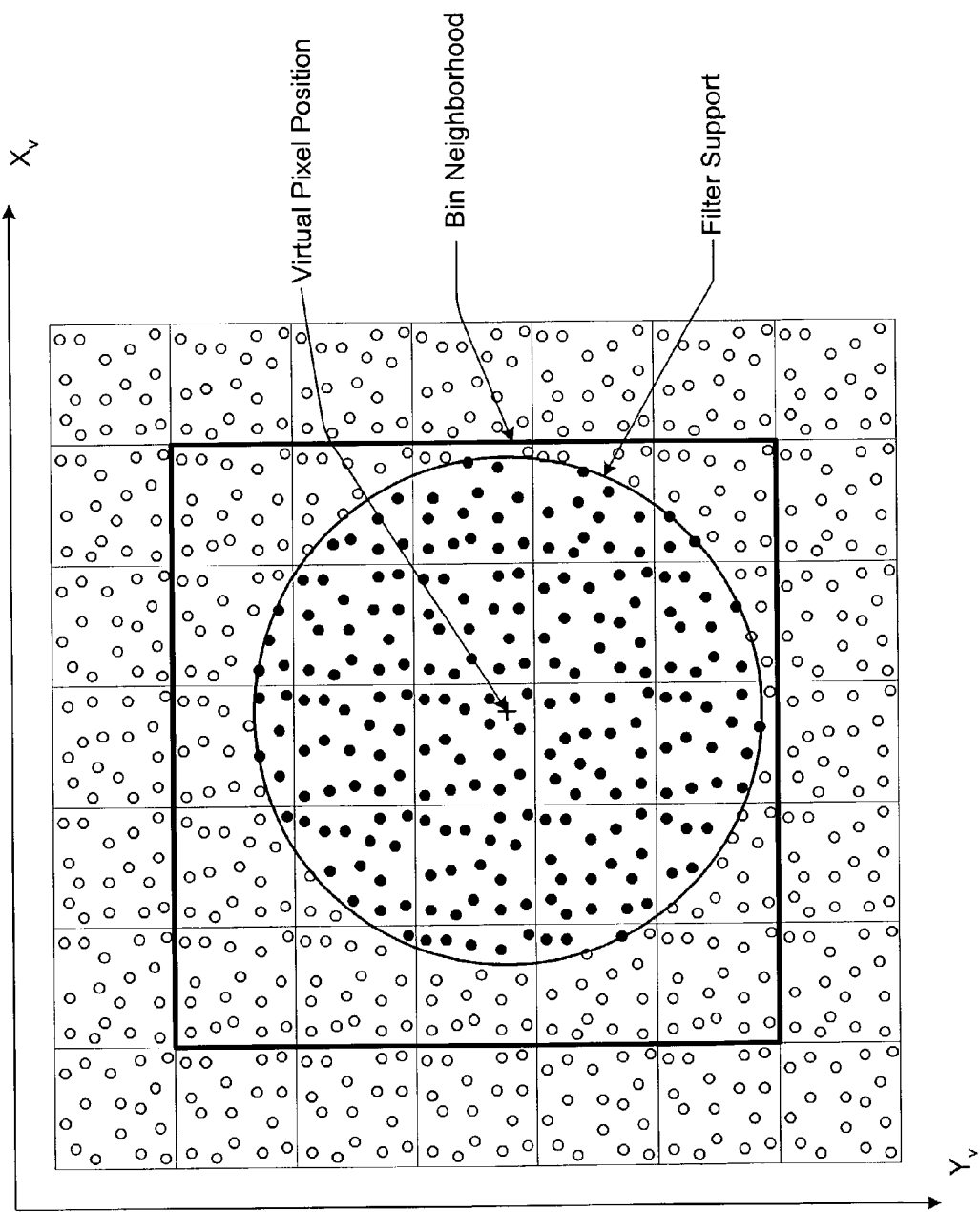
FIG. 9 illustrates the computation of a pixel at a virtual pixel position (denoted by the plus marker) according to one embodiment.

The filtering engine 600 may compute a video pixel at a particular virtual pixel position, as shown in FIG. 9. The filtering engine 600 may compute the video pixel based on a filtration of the samples falling within a support region centered on (or defined by) the virtual pixel position. Each sample S falling within the support region may be assigned a filter coefficient $C_S$ based on the sample's position (or some function of the sample's radial distance) with respect to the virtual pixel position.

Each of the color components of the video pixel may be determined by computing a weighted sum of the corresponding sample color components for the samples falling inside the filter support region. For example, the filtering engine 600 may compute an initial red value $r_P$ for the video pixel P according to the expression $$r_P = \Sigma C_S r_S,$$

where the summation ranges over each sample S in the filter support region, and where $r_S$ is the red sample value of the sample S. In other words, the filtering engine 600 may multiply the red component of each sample S in the filter support region by the corresponding filter coefficient $C_S$ and add up the products. Similar weighted summations may be performed to determine an initial green value $g_P$, an initial blue value $b_P$, and optionally, an initial alpha value $\alpha_P$ for the video pixel P based on the corresponding components of the samples.

Furthermore, the filtering engine 600 may compute a normalization value E by adding up the filter coefficients $C_S$ for the samples S in the bin neighborhood, i.e., $$E = \Sigma C_S.$$

The initial pixel values may then be multiplied by the reciprocal of E (or equivalently, divided by E) to determine normalized pixel values:

$$R_P = (1/E) * r_P$$

$$G_P = (1/E) * g_P$$

$$B_P = (1/E) * b_P$$

$$A_P = (1/E) * \alpha_P.$$

In one embodiment, the filter coefficient $C_S$ for each sample S in the filter support region may be determined by performing a table lookup. For example, a radially symmetric filter may be realized by a filter coefficient table, which is addressed by a function of a sample's radial distance with respect to the virtual pixel center. The filter support for a radially symmetric filter may be a circular disk as suggested by the example of FIG. 9. The support of a filter is the region in virtual screen space on which the filter is defined. The terms "filter" and "kernel" are used as synonyms herein. Let $R_f$ denote the radius of the circular support disk.

The filtering engine 600 may examine each sample S in a neighborhood of bins containing the filter support region. The bin neighborhood may be a rectangle (or square) of bins. For example, in one embodiment the bin neighborhood is a 5×5 array of bins centered on the bin that contains the virtual pixel position.

The filtering engine 600 may compute the square radius $(D^s)^2$ of each sample position $(X_S, Y_S)$ in the bin neighborhood with respect to the virtual pixel position $(X_P, Y_P)$ according to the expression $$(D_S)^2 = (X_S - X_P)^2 + (Y_S - Y_P)^2.$$

The square radius $(D_S)^2$ may be compared to the square radius $(R_f)^2$ of the filter support. If the sample's square radius is less than (or, in a different embodiment, less than or equal to) the filter's square radius, the sample S may be marked as being valid (i.e., inside the filter support). Otherwise, the sample S may be marked as invalid.

The filtering engine 600 may compute a normalized square radius $U_s$ for each valid sample S by multiplying the sample's square radius by the reciprocal of the filter's square radius:

$$U_S = (D_S)^2 1/(R_f)^2.$$

The normalized square radius $U_S$ may be used to access the filter coefficient table for the filter coefficient $C_S$. The filter coefficient table may store filter weights indexed by the normalized square radius.

In various embodiments, the filter coefficient table may be implemented in RAM and may be programmable by host software. Thus, the filter function (i.e. the filter kernel) used in the filtering process may be changed as needed or desired. Similarly, the square radius $(R_f)^2$ of the filter support and the reciprocal square radius $1/(R_f)^2$ of the filter support may be programmable.

Because the entries in the filter coefficient table are indexed according to normalized square distance, they need not be updated when the radius $R_f$ of the filter support changes. The filter coefficients and the filter radius may be modified independently.

In one embodiment, the filter coefficient table may be addressed with the sample radius $D_s$ at the expense of computing a square root of the square radius $(D_S)^2$. In another embodiment, the square radius may be converted into a floating-point format, and the floating-point square radius may be used to address the filter coefficient table. It is noted that the filter coefficient table may be indexed by any of various radial distance measures. For example, an $L^1$ norm or $L^{infinity}$ norm may be used to measure the distance between a sample position and the virtual pixel center.

Invalid samples may be assigned the value zero for their filter coefficients. Thus, the invalid samples end up making a null contribution to the pixel value summations. In other embodiments, filtering hardware internal to the filtering engine may be configured to ignore invalid samples. Thus, in these embodiments, it is not necessary to assign filter coefficients to the invalid samples.

In some embodiments, the filtering engine 600 may support multiple filtering modes. For example, in one collection of embodiments, the filtering engine 600 supports a box filtering mode as well as a radially symmetric filtering mode. In the box filtering mode, filtering engine 600 may implement a box filter over a rectangular support region, e.g., a square support region with radius $R_f$ (i.e., side length $2R_f$). Thus, the filtering engine 600 may compute boundary coordinates for the support square according to the expressions $X_P+R_f$, $X_P-R_f$, $Y_P+R_f$, and $Y_P-R_f$. Each sample S in the bin neighborhood may be marked as being valid if the sample's position $(X_S,Y_S)$ falls within the support square, i.e., if $$X_P-R_f<X_S<X_P+R_f \text{ and}$$

$$Y_P-R_f<Y_S<Y_P+R_f.$$

Otherwise, the sample S may be marked as invalid. Each valid sample may be assigned the same filter weight value (e.g., $C_S=1$). It is noted that any or all of the strict inequalities (<) in the system above may be replaced with permissive inequalities ($\leq$).

The filtering engine 600 may use any of a variety of filters either alone or in combination to compute pixel values from sample values. For example, the filtering engine 600 may use a box filter, a tent filter, a cone filter, a cylinder filter, a Gaussian filter, a Catmull-Rom filter, a Mitchell-Netravali filter, a windowed sinc filter, or in general, any form of band pass filter or any of various approximations to the sinc filter.

In one set of embodiments, the filtering engine 600 may include a set of filtering units $F(0)$, $F(1)$, $F(2)$, ..., $F(N_f-1)$ operating in parallel, where the number $N_f$ of filtering units is a positive integer. For example, in one embodiment, $N_f=4$. In another embodiment, $N_f=8$.

The filtering units may be configured to partition the effort of generating each frame (or field of video). A frame of video may include an $M_P \times N_P$ array of pixels, where $M_P$ denotes the number of pixels per line, and $N_P$ denotes the number of lines. Each filtering unit $F(K)$ may be configured to generate a corresponding subset of the pixels in the $M_P \times N_P$ pixel array. For example, in the $N_f=4$ case, the pixel array may be partitioned into four vertical stripes, and each filtering unit $F(K)$, $K=0, 1, 2, 3$, may be configured to generate the pixels of the corresponding stripe.

Filtering unit $F(K)$ may include a system of digital circuits that implement the processing loop suggested below. The values $X_{start}(K)$ and $Y_{start}(K)$ represent the start position for the first (e.g. top-left) virtual pixel center in the $K^{th}$ stripe of virtual pixel centers. The values $\Delta X(K)$ and $\Delta Y(K)$ represent respectively the horizontal and vertical step size between virtual pixel centers in the $K^{th}$ stripe. The value $M_H(K)$ represents the number of pixels horizontally in the $K^{th}$ stripe. For example, if there are four stripes ($N_f=4$) with equal width, $M_H(K)$ may be set equal to $M_P/4$ for $K=0, 1, 2, 3$. Filtering unit $F(K)$ may generate a stripe of pixels in a scan line fashion as follows:

I=0;
J=0;
$X_P=X_{start}(K)$;
$Y_P=Y_{start}(K)$;
while (J<$N_P$) {
  while (I <$M_H(K)$) {
    PixelValues=Filtration($X_P$, $Y_P$);
    Send PixelValues to Output Buffer;
    X=$X_P$+$\Delta X(K)$;
    I=I+1;
  }
  $X_P=X_{start}(K)$
  $Y_{P=YP}+\Delta Y(K)$;
  J=J+1;
}

The expression Filtration($X_P$,$Y_P$) represents the filtration of samples in the filter support region of the current virtual pixel position ($X_P$,$Y_P$) to determine the components (e.g., RGB values and, optionally, an alpha value) of the current pixel as described above. Once computed, the pixel values may be sent to an output buffer for merging into a video stream. The inner loop generates successive virtual pixel positions within a single row of the stripe. The outer loop generates successive rows. The above fragment may be executed once per video frame (or field). Filtering unit $F(K)$ may include registers for programming the values $X_{start}(K)$, $Y_{start}(K)$, $\Delta X(K)$, $\Delta Y(K)$, and $M_H(K)$. These values are dynamically adjustable from host software. Thus, the graphics system 100 may be configured to support arbitrary video formats.

Figure 10:
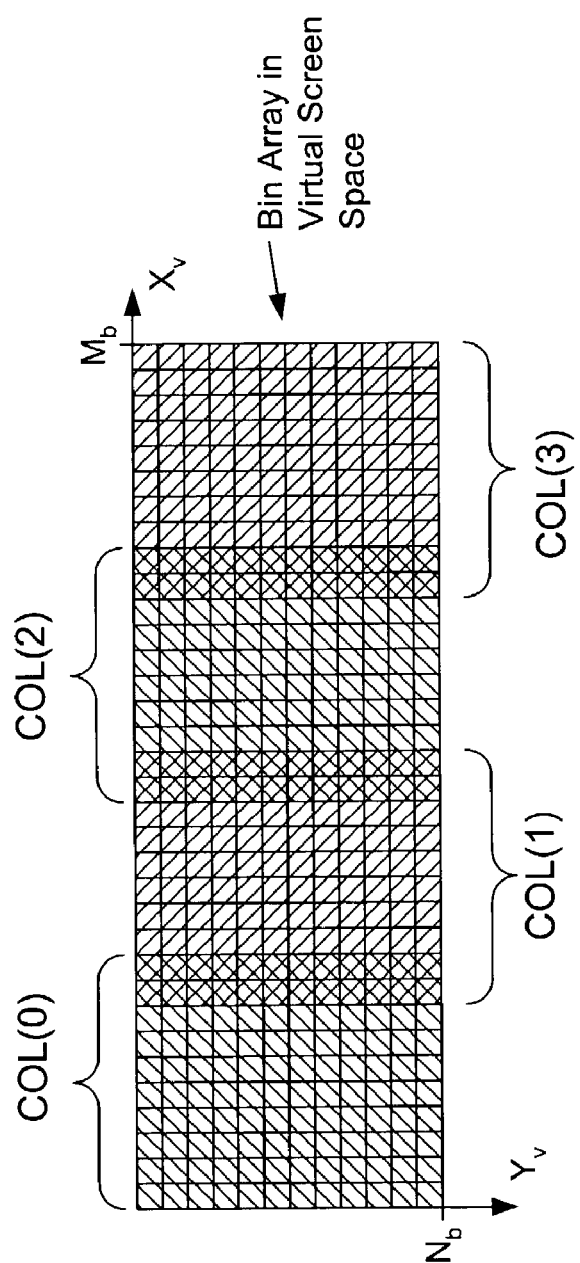
FIG. 10 illustrates a set of columns in the spatial bin array, wherein the $K^{th}$ column defines the subset of memory bins (from the sample buffer) that are used by a corresponding filtering unit $F(K)$ of the filtering engine.

Each filtering unit $F(K)$ accesses a corresponding subset of bins from the sample buffer 500 to generate the pixels of the $K^{th}$ stripe. For example, each filtering unit $F(K)$ may access bins corresponding to a column COL(K) of the bin array in virtual screen space as suggested by FIG. 10. Each column may be a rectangular subarray of bins. Note that column COL(K) may overlap with adjacent columns. This is a result of using a filter function with filter support that covers more than one spatial bin. Thus, the amount of overlap between adjacent columns may depend on the radius of the filter support.

Figure 11:
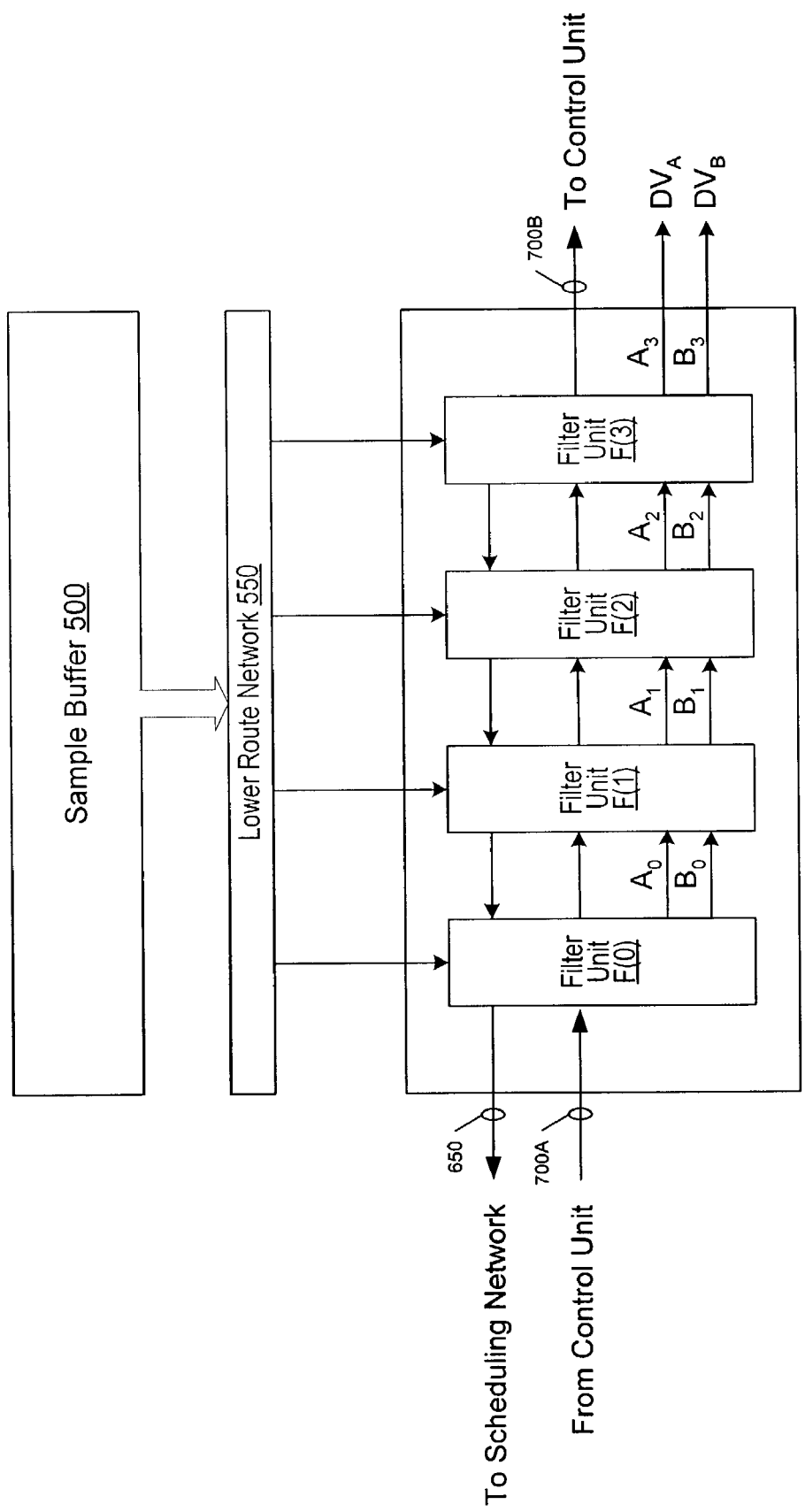
FIG. 11 illustrates one embodiment of filtering engine 600.

The filtering units may be coupled together in linear succession as shown in FIG. 11 for the case $N_f=4$. Except for the first filtering unit $F(0)$ and the last filtering unit $F(N_f-1)$, each filtering unit $F(K)$ may be configured to receive digital video input streams $A_{K-1}$ and $B_{K-1}$ from a previous filtering unit $F(K-1)$, and to transmit digital video output streams $A_K$ and $B_K$ to the next filtering unit $F(K+1)$. The first filtering unit $F(0)$ generates video streams $A_0$ and $B_0$ and transmits these streams to filtering unit $F(1)$. The last filtering unit $F(N_f-1)$ receives digital video streams $A_{Nf-2}$ and $B_{Nf-2}$ from the previous filtering unit $F(N_f-2)$, and generates digital video output streams $A_{Nf-1}$ and $B_{Nf-1}$ (also referred to as video streams $DV_A$ and $DV_B$ respectively). Video streams $A_0, A_1, \ldots, A_{Nf}-1$ are said to belong to video stream A. Similarly, video streams $B_0, B_1, \ldots, B_{Nf-1}$ are said to belong to video stream B. Note that more than two video streams may be generated by the filtering units in some embodiments.

Each filtering unit $F(K)$ may be programmed to mix (or substitute) its computed pixel values into either video stream A or video stream B. For example, if the filtering unit $F(K)$ is assigned to video stream A, the filtering unit $F(K)$ may mix (or substitute) its computed pixel values into video stream A, and pass video stream B unmodified to the next filtering unit $F(K+1)$. In other words, the filtering unit $F(K)$ may mix (or replace) at least a subset of the dummy pixel values present in video stream $A_{K-1}$ with its locally computed pixel values. The resultant video stream $A_K$ is transmitted to the next filtering unit. The first filtering unit F(0) may generate video streams $AK_{-1}$ and $B_{-1}$ containing dummy pixels (e.g., pixels having a background color), and mix (or substitute) its computed pixel values into either video stream $A_{-1}$ or $B_{31\_1}$, and pass the resulting streams $A_0$ and $B_0$ to the filtering unit F(1). Thus, the video streams A and B mature into complete video signals as they are operated on by the linear succession of filtering units.

The filtering unit F(K) may also be configured with one or more of the following features: color look-up using pseudo color tables, direct color, inverse gamma correction, and conversion of pixels to non-linear light space. Other features may include programmable video timing generators, programmable pixel clock synthesizers, cursor generators, and crossbar functions.

While much of the present discussion has focused on the case where $N_f=4$, it is noted that the inventive principles described in this special case naturally generalize to arbitrary values for the parameter $N_f$ (the number of filtering units).

Figure 12:
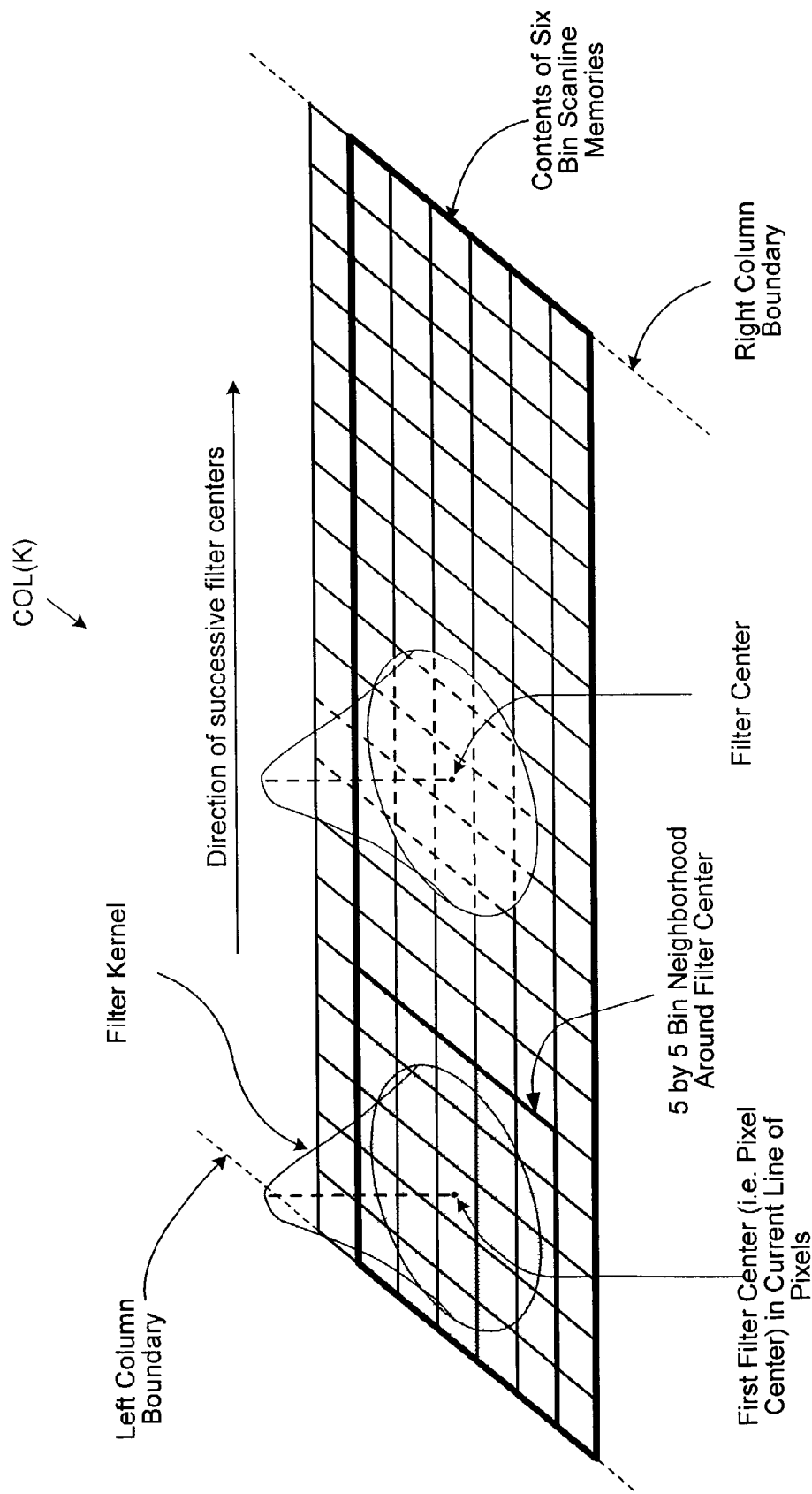
FIG. 12 illustrates one embodiment of a computation of pixels at successive filter center (i.e., virtual pixel centers) across a bin column.

In one set of embodiments, each filtering unit F(K) may include (or couple to) several bin scanline memories (BSMs). Each bin scanline memory may contain sufficient capacity to store a horizontal line of bins within the corresponding column COL(K). For example, in some embodiments, filtering unit F(K) may include six bin scanline memories as suggested by FIG. 12.

Filtering unit F(K) may move the filter centers through the column COL(K) in a raster fashion, and generate a pixel at each filter center. The bin scanline memories may be used to provide fast access to the memory bins used for a line of pixel centers. As the filtering unit F(K) may use samples in a 5 by 5 neighborhood of bins around a pixel center to compute a pixel, successive pixels in a line of pixels end up using a horizontal band of bins that spans the column and measures five bins vertically. Five of the bin scan lines memories may store the bins of the current horizontal band. The sixth bin scan line memory may store the next line of bins, after the current band of five, so that the filtering unit F(K) may immediately begin computation of pixels at the next line of pixel centers when it reaches the end of the current line of pixel centers.

As the vertical displacement $\Delta Y$ between successive lines of virtual pixels centers may be less than the vertical size of a bin, not every vertical step to a new line of pixel centers necessarily implies use of a new line of bins. Thus, a vertical step to a new line of pixel centers will be referred to as a nontrivial drop down when it implies the need for a new line of bins. Each time the filtering unit F(K) makes a nontrivial drop down to a new line of pixel centers, one of the bin scan line memories may be loaded with a line of bins in anticipation of the next nontrivial drop down.

Much of the above discussion has focused on the use of six bin scanline memories in each filtering unit. However, more generally, the number of bin scanline memories may be one larger than the diameter (or side length) of the bin neighborhood used for the computation of a single pixel. For example, in an alternative embodiment, the bin neighborhood may be a 7×7 array of bins. Other numbers of bin scanline memories may be used in other embodiments.

Furthermore, each of the filtering units F(K) may include a bin cache array to store the memory bins that are immediately involved in a pixel computation. For example, in some embodiments, each filtering unit F(K) may include a 5×5 bin cache array, which stores the 5×5 neighborhood of bins that are used in the computation of a single pixel. The bin cache array may be loaded from the bin scanline memories.

As noted above, each rendering pipeline of the rendering engine 300 generates sample positions in the process of rendering primitives. Sample positions within a given spatial bin may be generated by adding a vector displacement $(\Delta X, \Delta Y)$ to the vector position $(X_{bin}, Y_{bin})$ of the bin's origin (e.g., the top-left corner of the bin). To generate a set of sample positions within a spatial bin implies adding a corresponding set of vector displacements to the bin origin. To facilitate the generation of sample positions, each rendering pipeline may include a programmable jitter table which stores a collection of vector displacements $(\Delta X, \Delta Y)$. The jitter table may have sufficient capacity to store vector displacements for an $M_J \times N_J$ tile of bins. Assuming a maximum sample position density of $D_{max}$ samples per bin, the jitter table may store $M_J*N_J*D_{max}$ vector displacements to support the tile of bins. Host software may load the jitter table with a pseudo-random pattern of vector displacements to induce a pseudo-random pattern of sample positions. In one embodiment, $M_J=N_J=2$ and $D_{max}=16$.

A straightforward application of the jitter table may result in a sample position pattern that repeats with a horizontal period equal to $M_J$ bins and a vertical period equal to $N_J$ bins. However, in order to generate more apparent randomness in the pattern of sample positions, each rendering engine may also include a permutation circuit that applies transformations to the address bits going into the jitter table and/or transformations to the vector displacements coming out of the jitter table. The transformations depend on the bin horizontal address $X_{bin}$ and the bin vertical address $Y_{bin}$.

Each rendering unit may employ such a jitter table and permutation circuit to generate sample positions. The sample positions are used to compute samples, and the samples are written into sample buffer 500. Each filtering unit of the filtering engine 600 reads samples from sample buffer 500, and may filter the samples to generate pixels. Each filtering unit may include a copy of the jitter table and permutation circuit and may reconstruct the sample positions for the samples it receives from the sample buffer 500, i.e., the same sample positions that are used to compute the samples in the rendering pipelines. Thus, the sample positions need not be stored in sample buffer 500.

As noted above, sample buffer 500 stores the samples, which are generated by the rendering pipelines and used by the filtering engine 600 to generate pixels. The sample buffer 500 may include an array of memory devices, e.g., memory devices such as SRAMs (Static Random Access Memory), SDRAMs (Synchronous Dynamic Random Access Memory), RDRAMs (Rambus Dynamic Random Access Memory), 3DRAMs, or 3DRAM64s. In one collection of embodiments, the memory devices are 3DRAM64 devices manufactured by Mitsubishi Electric Corporation. The memory devices of the sample buffer may be organized into $N_{MB}$ memory banks denoted MB(0), MB(1), MB(2), . . . MB($N_{MB}$−1), where $N_{MB}$ is a positive integer.

Each memory bank MB may include a number of memory devices. For example, in some embodiments, each memory bank includes four memory devices.

Each memory device stores an array of data items. Each data item may have sufficient capacity to store sample color in a double-buffered fashion, and other sample components such as z depth in a single-buffered fashion. For example, in one set of embodiments, each data item may include 116 bits of sample data defined as follows:

30 bits of sample color (for front buffer), 30 bits of sample color (for back buffer),
16 bits of alpha and/or overlay,
10 bits of window ID,
26 bits of z depth, and
4 bits of stencil.

Each of the memory devices may include one or more pixel processors, referred to herein as memory-integrated pixel processors. The 3DRAM and 3DRAM64 memory devices manufactured by Mitsubishi Electric Corporation have such memory-integrated pixel processors. The memory-integrated pixel processors may be configured to apply processing operations such as blending, stenciling, and Z buffering to samples. 3DRAM64s are specialized memory devices configured to support internal double-buffering with single-buffered Z in one chip.

Figure 13:
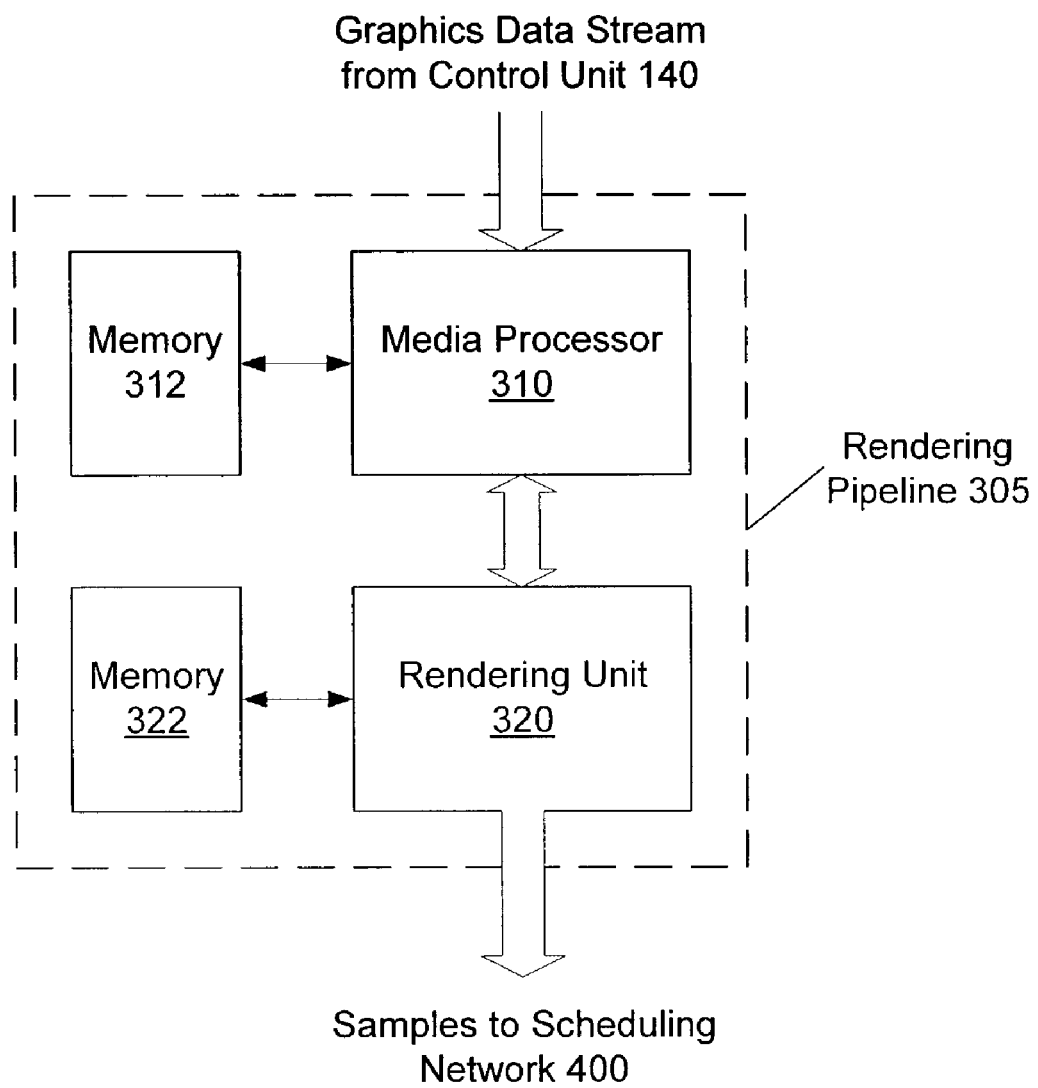
FIG. 13 illustrates one embodiment of a rendering pipeline including a media processor and a rendering unit.

As described above, the rendering engine 300 may include a set of rendering pipelines RP(0), RP(1), ..., RP($N_{PL}$-1). FIG. 13 illustrates one embodiment of a rendering pipeline 305 that may be used to implement each of the rendering pipelines RP(0), RP(1), ..., RP($N_{PL}$-1). The rendering pipeline 305 may include a media processor 310 and a rendering unit 320.

The media processor 310 may operate on a stream of graphics data received from the control unit 200. For example, the media processor 310 may perform the three-dimensional transformation operations and lighting operations such as those indicated at 710 through 735 of FIG. 4. The media processor 310 may be configured to support the decompression of compressed geometry data.

The media processor 310 may couple to a memory 312, and may include one or more microprocessor units. The memory 312 may be used to store program instructions and/or data for the microprocessor units. Memory 312 may also be used to store display lists and/or vertex texture maps. In one embodiment, memory 312 includes Direct Rambus DRAM (i.e., DRDRAM) devices.

The rendering unit 320 may receive transformed and lit vertices from the media processor, and perform processing operations such as those indicated at 737 through 775 of FIG. 4. In some embodiments, the rendering unit 320 is an application specific integrated circuit (ASIC). The rendering unit 320 may couple to memory 322 which may be used to store texture information (e.g., one or more layers of textures). Memory 322 may include SDRAM (synchronous dynamic random access memory) devices. The rendering unit 310 may send computed samples to sample buffer 500 through scheduling network 400.

Figure 14:
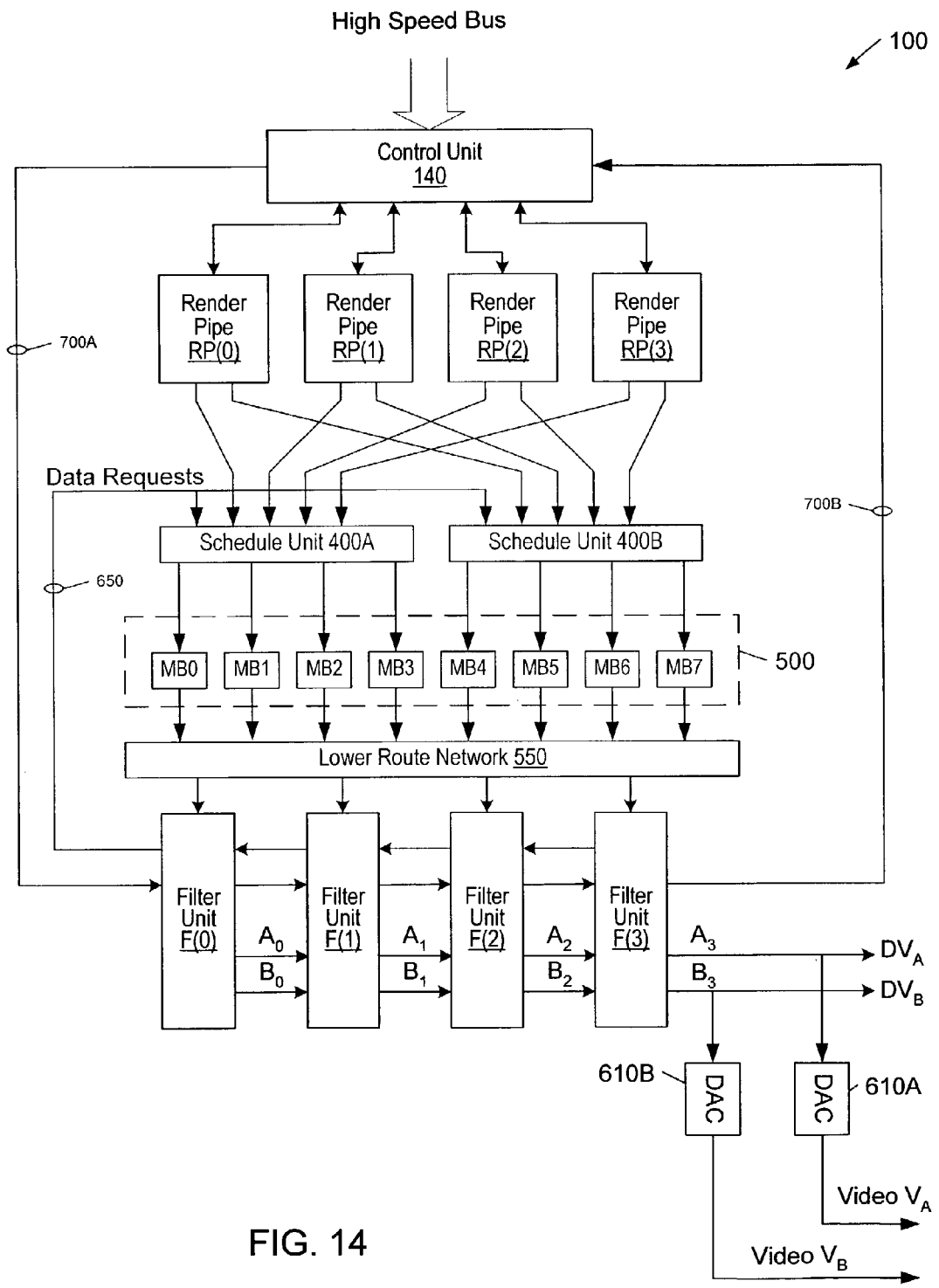
FIG. 14 illustrates one embodiment of graphics accelerator 100.

FIG. 14 illustrates one embodiment of the graphics accelerator 100. In this embodiment, the rendering engine 300 includes four rendering pipelines RP(0) through RP(3), scheduling network 400 includes two schedule units 400A and 400B, sample buffer 500 includes eight memory banks MB(0) through MB(7), and filtering engine 600 includes four filtering units F(0) through F(3). The filtering units may generate two digital video streams $DV_A$ and $DV_B$. The digital video streams $DV_A$ and $DV_B$ may be supplied to digital-to-analog converters (DACs) 610A and 610B, where they are converted into analog video signals $V_A$ and $V_B$ respectively. The analog video signals are supplied to video output ports. In addition, the graphics system 100 may include one or more video encoders. For example, the graphics system 100 may include an S-video encoder.

Figure 15:
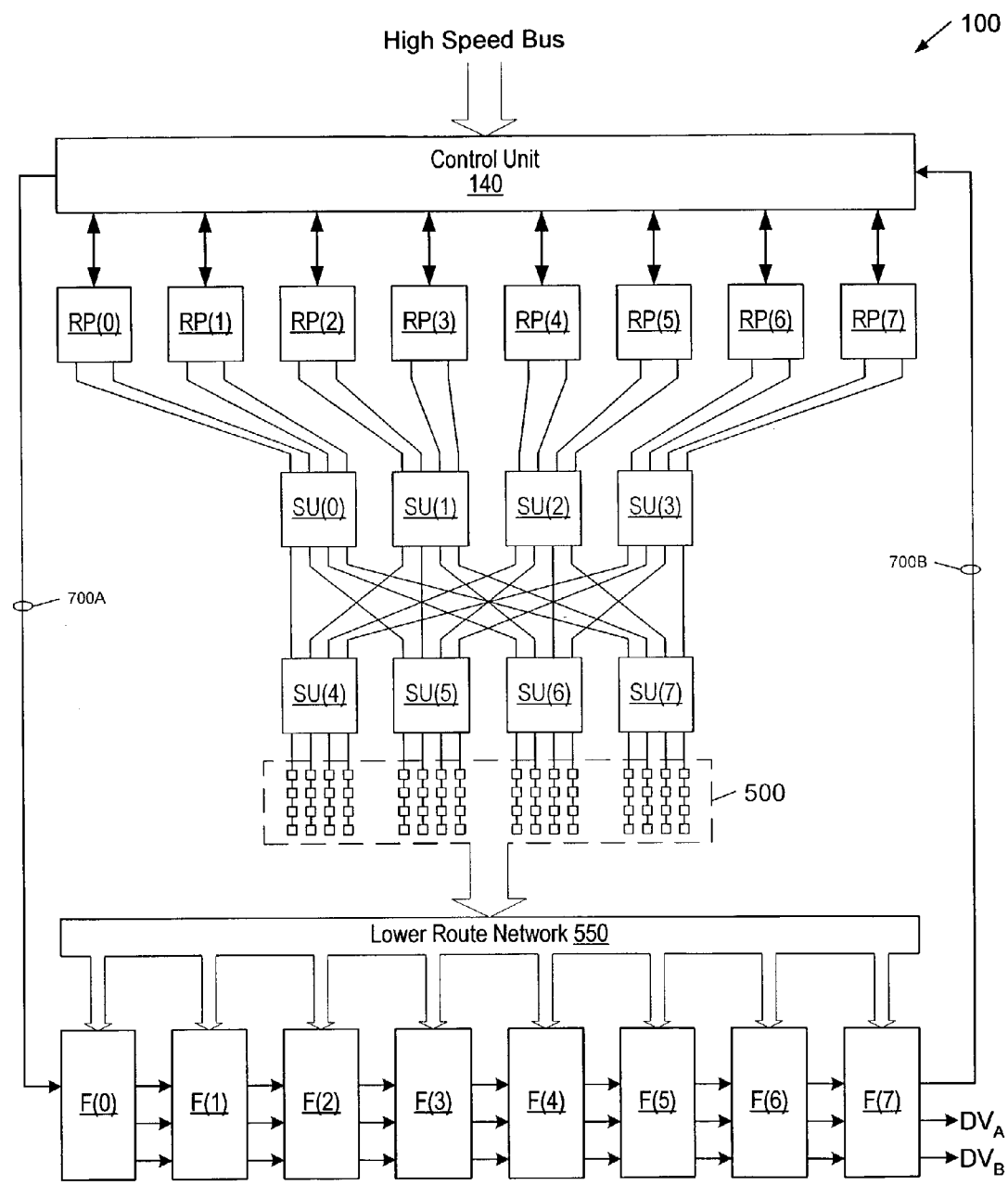
FIG. 15 illustrates another embodiment of graphics accelerator 100.

FIG. 15 illustrates another embodiment of graphics system 100. In this embodiment, the rendering engine 300 includes eight rendering pipelines RP(0) through RP(7), the scheduling network 400 includes eight schedule units SU(0) through SU(7), the sample buffer 500 includes sixteen memory banks, the filtering engine 600 includes eight filtering units F(0) through F(7). This embodiment of graphics system 100 also includes DACs to convert the digital video streams $DV_A$ and $DV_B$ into analog video signals.

Observe that the schedule units are organized as two layers. The rendering pipelines couple to the first layer of schedule unit SU(0) through SU(3). The first layer of schedule units couple to the second layer of schedule units SU(4) through SU(7). Each of the schedule units in the second layer couples to four banks of memory device in sample buffer 500.

FIGS. 1–15 are meant to illustrate exemplary embodiments of a graphics system. Note that other embodiments may have significantly different architectures.

Figure 16:
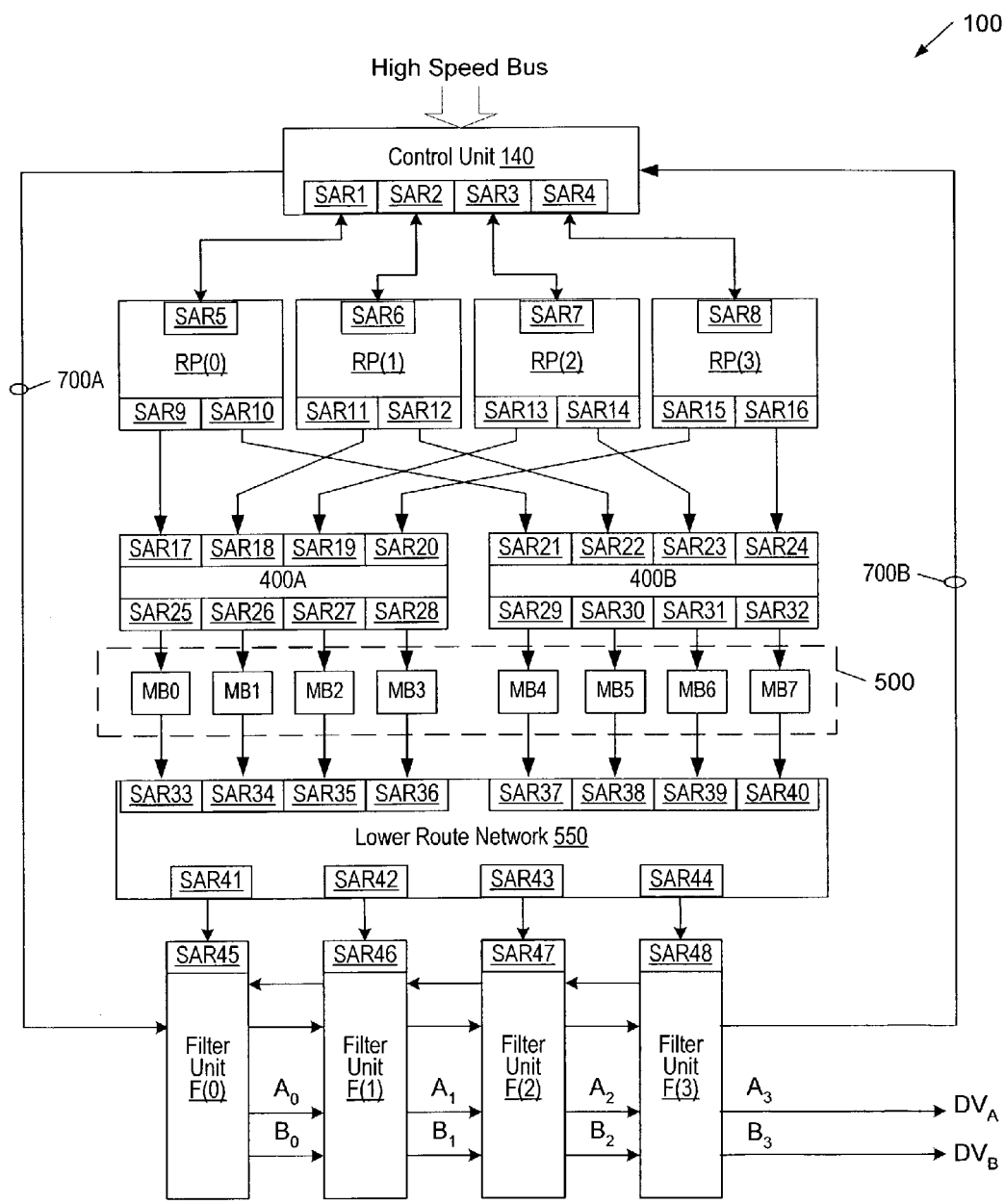
FIG. 16 illustrates an embodiment of a graphics accelerator 100 that includes multiple signature analysis registers (SARs)
Figure 17:
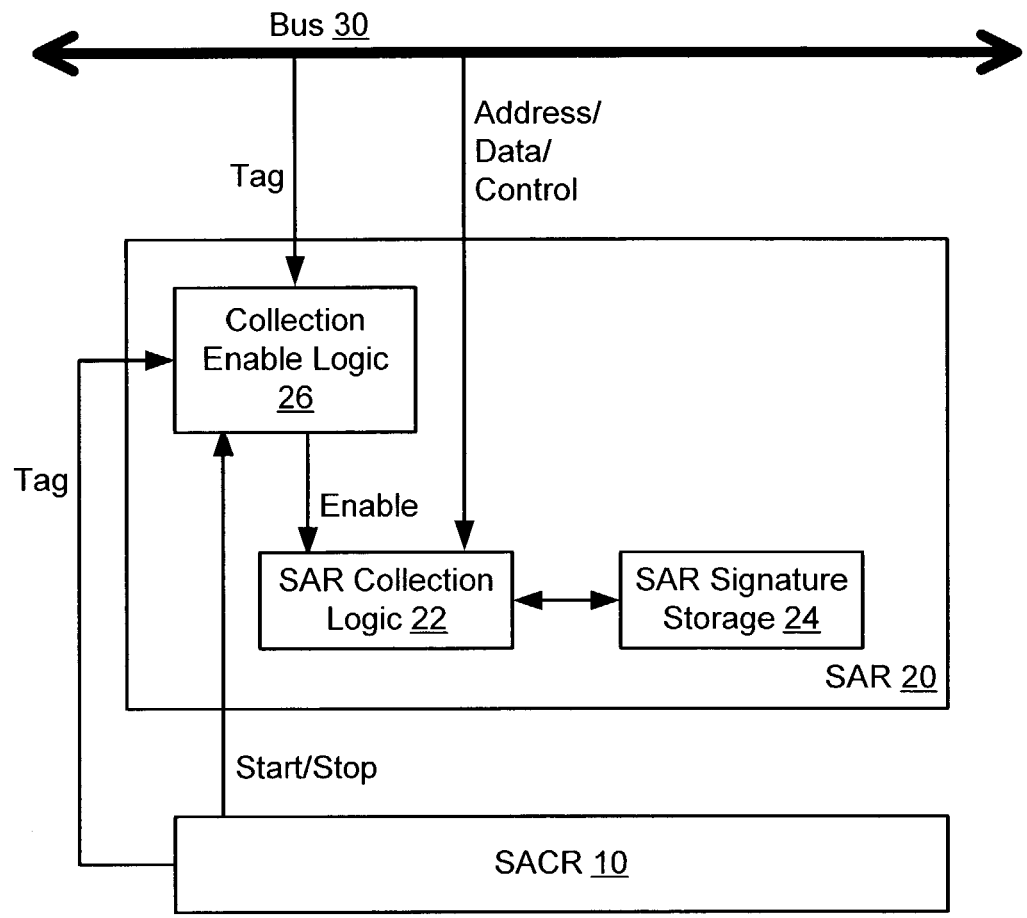
FIG. 17 illustrates an SAR according to one embodiment.
Figure 18:
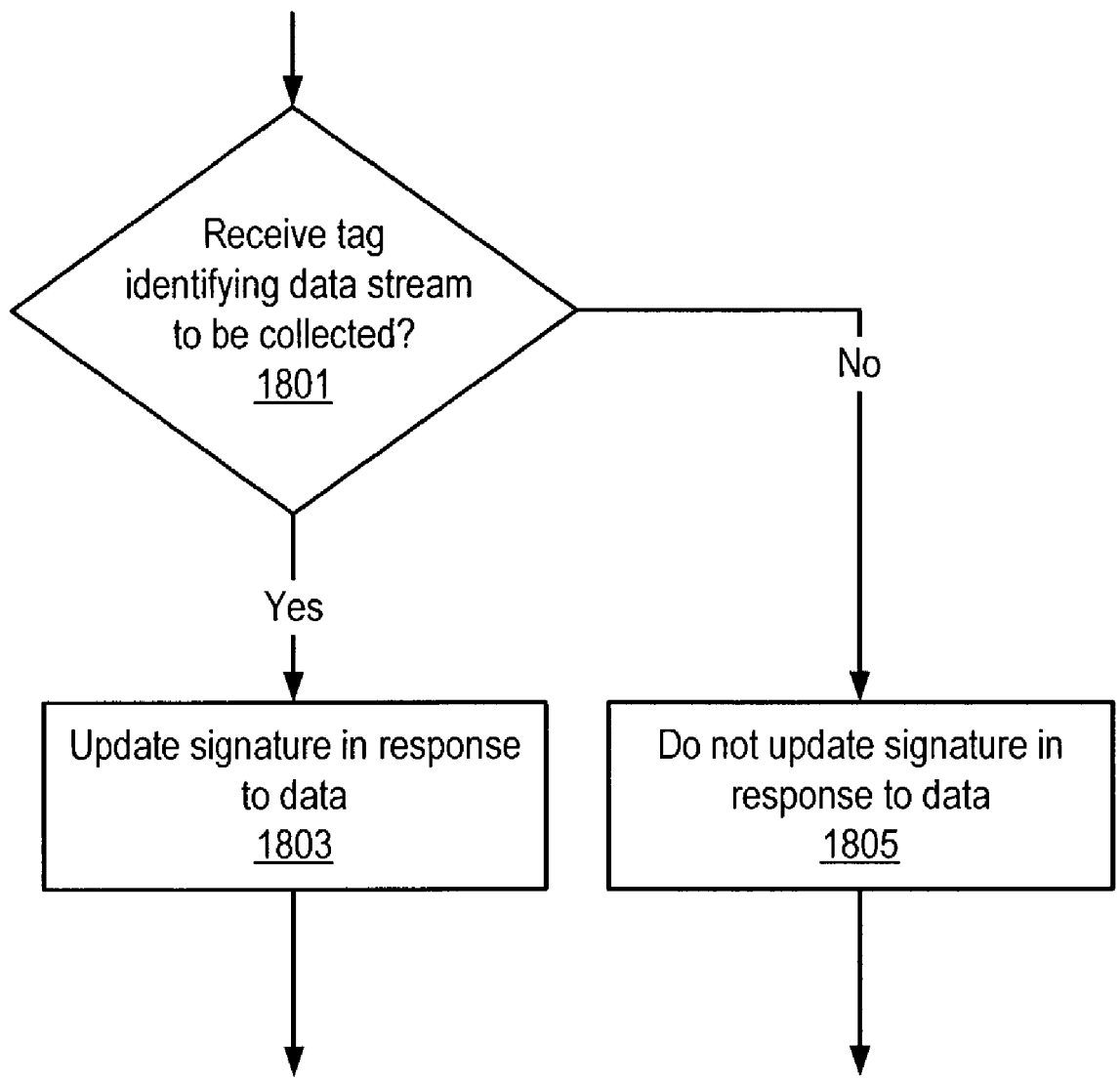
FIG. 18 illustrates one embodiment of a method of performing signature analysis in the presence of multiple data streams.

Signature Analysis—FIGS. 16–18

In order to provide testing capabilities within a device that processes multiple data streams, such as the graphics accelerator 100 shown above, the device to be tested may include signature analysis hardware. The signature analysis hardware may include several signature analysis registers (SARs) that each store a signature. The signature analysis hardware may also include control hardware (e.g., one or more signature analysis control registers, or SACRs) that controls how data, address, and/or control signals are added to the existing signature(s) stored within each SAR and allows capture to be started and stopped.

Various ICs (Integrated Circuits) included in a system like graphics accelerator 100 may include one or more SARs and SACRs to support diagnostics that allow component-level fault isolation. Each SAR may be coupled to a particular data, address, and/or control bus port in order to capture values being transferred. Each SAR may be configured to collect values each bus cycle. As data, address, and/or control signal values are captured, these collected signal values may be combined with the seed value or signature to form a new signature. Subsequently collected values may be similarly combined with the existing signature.

FIG. 16 shows how SARs may be included in the graphics accelerator 100 shown in FIG. 14 (Note that some elements included in FIG. 14 have been omitted from FIG. 16 for clarity). Here, several SARs SAR1-SAR48 are included at various input and output ports within devices included in the graphics accelerator. Note that some devices may be implemented in the same IC, while other devices may be implemented in separate ICs. In the illustrated example, each SAR may be configured to collect data, control, and/or address signals being input to or output from a device in which that SAR is included. Note that in other embodiments, SARs may be configured to collect data, control, and/or address signals being both input to and output from a device.

Thus, SARs may be placed at the data and address bus interfaces used to send data into/out of each IC (e.g., an ASIC or microprocessor) so that each bus and/or each IC can be verified. For example, the SARs may be included at the various interfaces in order to determine whether the data sent to an IC is the same as the data received by that IC. SARs may also be used to verify whether an IC is working by detecting situations in which the data entering the IC is correct and the data leaving the IC is incorrect.

The number of SARS coupled to each IC's internal and/or external bus(es) may be selected according to several factors, including the direction of data transmission (i.e., input to and/or output from the chip) on that bus, the destination of the data, the type (e.g., input, output, or both) of transactions to be collected, and/or whether the data is ordered or unordered. Each SAR is a finite number of bits wide. If the bus monitored by a particular SAR is wider than the SAR's width, more than one SAR may be used to monitor that bus. Each SAR may be read and write accessible for all SAR bits so that each signature bit can be verified (e.g., to check for stuck-at faults) prior to signature collection.

Each SAR is controlled by an associated SACR. In some embodiments, more than one SAR may be controlled by a single SACR. An SACR may include several fields. Each field may include one or more bits. The current values of the bits in each field indicate the current SACR settings. For example, one single-bit field may indicate whether signature capture is enabled. A test program may set this bit to initiate capture and clear this bit to halt capture. Thus, the SACRs allow a test to start and/or stop signature collection. In some embodiments, some SACRs may also allow a count to be programmed. The count may indicate an amount of data and/or a number of data transactions to be collected during signature analysis. The count may be overridden (e.g., if signature collection is halted before the count would otherwise have halted signature collection).

In embodiments supporting more than one signature collection algorithm, another field within an SACR may indicate which collection algorithm is currently selected. A test application may use this field to select which signature collection algorithm is used by a particular SAR during a particular test. Different SACRs within the same system may have different collection algorithm settings in one embodiment. For example, each SAR that collects ordered data may do so using an LHCA (Linear Hybrid Cellular Automata) signature collection algorithm or other collection algorithm that generates an order-dependent signature. Generally, a cellular automaton is a discrete dynamical system where the signatures in each SAR are updated according to a local rule. The SARs may be updated at discrete time intervals. The value of each bit within an SAR may depend on what its value was in the previous time step. Additionally, each bit's value may also depend on the values in neighboring bits in the previous time step.

Unordered data may be collected using a checksum collection algorithm or other collection algorithm that generates an order-independent signature (i.e., the same signature is generated for the same data set, regardless of whether the data within the set is captured in a particular order). A mixed stream of ordered and unordered data may be captured using an order-independent collection algorithm. In some embodiments, the signature collection algorithm used to collect ordered data may generate an order-independent signature. Various other algorithms may be used to combine each new data or control signal being captured to the signature. For example, one algorithm may involve XORing a captured bit with all or part of the preexisting signature. Signature calculation algorithms may be chosen so each set of test data and/or test control signals has a (nearly) unique signature. This way, the possibility that a flawed system will produce the correct signature may be reduced. In embodiments where the test sets are large, it may be useful to select an algorithm that is capable of capturing a large amount of data without creating repetitive signatures. As more data is captured, the amount of error detection may increase.

In many embodiments, signature analysis may be performed in response to a software testing application. Such a testing application may determine whether signature analysis is currently taking place before initiating signature analysis (e.g., by checking the status of a "busy" indication included in a SACR). If signature analysis is not currently taking place, the testing application may reset the SAR to an initialized state. In some embodiments, all or some of the SARs may be initialized to a non-zero seed value or signature. The seed value(s) chosen for a particular test may correspond to the test data being used with that test. Note that a different seed value may be stored in each SAR. In one embodiment, each SAR's seed value may be a zero value (e.g., input by resetting each SAR). The testing application may then initialize the SACRs to initiate signature collection and initiate several transactions that cause data to be transferred between and/or processed within various ICs included in the system.

Different sets of test data, address, and/or control signals may be used in order to stress particular hardware within the system. Depending on which of tests pass and which fail, flawed hardware may be detected. The programming sequence may also involve waiting for the stimulus to propagate and, if needed, stopping signature collection. Once the signature analysis is complete, the testing application may access the signatures stored in the SARs and compare the values to signatures that are known to be correct (i.e., "golden" signatures). By comparing a calculated signature with a golden signature that is known to be correct for the same set of data, a pass/fail determination of the hardware under test may be made. The control signatures may be generated by a known working system or by simulation. Note that in some embodiments, read accesses to a particular SAR may also affect the signature stored in that SAR (on in another SAR within the system).

After capturing a signature, each SAR may continue to store the captured signature until its signature fields are cleared, a new seed value is written to its signature field, or capture is reinitiated. For example, in some embodiments, another capture may be requested using the previously captured signatures as the starting value (as opposed to storing a new seed value in each of the SARs) in order to capture more cycles of data and/or control signals than were requested in the previous capture.

Some ICs may not have host-accessible data buses. In order to access signature registers included on such ICs during testing, a special Serial Test Access Port (STAP) may be added to each such IC. The STAP may allow the host to access the signature register(s) during testing. The STAP may couple to a Serial Test Access Bus, which may in turn be controlled by a STAP controller (e.g., included in another IC within the system). The STAP controller may be programmable to perform reads or writes via a host bus (e.g., in response to commands received via a JTAG interface).

Thus, SARs may be arranged so that the signature in each may be used to verify a certain section of a system. SARs may also be included at various interface locations within the system in order to test each interface. As described above, data may be reordered and/or additionally processed as it flows through the graphics system, so the final signature stored in each SAR may differ from each of the other signatures for any given test. Furthermore, some tests may only target certain SARs (e.g., those included in a certain portion of the system).

At various places within a system like the one shown in FIG. 16, multiple data streams may be processed and routed to another portion of the system. For example, the control unit 140 subdivides an input data stream received via the high speed bus into several substreams. Each substream is provided to a respective one of the render pipes RP0-RP3. The processed substreams may be output from the render pipes to one or both of the schedule units 400.

The schedule units 400 may each route received data to one or more memory banks within frame buffer 500. For example, the schedule units 400 may couple the render pipes RP0-RP3 to the frame buffer 500 so that each render pipe can access each memory bank within the frame buffer. In the illustrated embodiment, each schedule unit 400 has four input ports and four output ports. An SAR may be coupled to each input port and each output port, as shown in FIG. 16. In order to facilitate communication of the data streams received from the render pipes to the frame buffer 500, each schedule unit 400 may be configured to queue access requests (e.g., data write requests) received via each input port and route each queued access request to the appropriate output port (or ports, in some embodiments). In one embodiment, the appropriate output port to which a particular request should be routed may be selected based on the x, y, and sample address associated with the data. Each input port may have an associated queue (e.g., a FIFO buffer). Queued requests may be selected for routing to the appropriate output port from each input port in a round-robin manner in some embodiments. Since the order in which data in each data stream is received by each schedule unit may depend on how quickly each render pipe processes its substream relative to the other render pipes, and since the order in which data in each stream is routed within the schedule units may vary depending on when each substream was received relative to the other substreams, the data streams flowing past each output port of each schedule unit 400 may be non-deterministic. Accordingly, the data flowing past SARs SAR25-SAR32 may not be deterministic, resulting in unpredictable signatures in each of these SARs.

Thus, as shown in the system of FIG. 16, one or more routing devices may route multiple data streams between other devices (e.g., integrated circuits). While each data stream may itself be deterministic, the aggregate data stream that is passed to one or more recipient components by the routing circuit may not be deterministic. For example, while the control unit 140 may divide the input stream into substreams for processing by the render pipes RP0-RP3 in a predictable manner, the order in which each render pipe processes a particular section of a substream and passes that section of the processed substream to a schedule unit may not be deterministic relative to the other render pipe's activity. Similarly, the order in which the schedule unit selects queued data from each of the substreams for forwarding to an output port may not be deterministic. This unpredictability may result from different propagation delays for different data streams and differences in the outcome of arbitration within the routing device. For example, during performance of one test, data in one data stream may be transmitted within the routing device before data in another data stream is transmitted. In another test, the opposite may happen. Accordingly, the aggregate data stream captured within the routing device may vary between different test executions on the same system as well as between executions of the same test on different systems. It may not be possible to perform signature analysis within certain parts of the system due to the non-deterministic aggregation of several deterministic data streams. For example, if the data is being collected according to an ordered signature collection algorithm, these differences may cause unpredictable signatures to be collected.

In order to correctly perform signature analysis in the presence of multiple data streams, certain SARs shown in FIG. 16 may be configured similarly to the embodiment of an SAR shown in FIG. 17. In FIG. 17, an SAR 20 is configured to receive a tag that corresponds to data within one or more data streams. Each data stream may have a unique tag associated with it that is used to distinguish that data stream from the others. SAR 20 may be configured to collect data (i.e., by modifying the signature stored by SAR 20 in response to the data) if that data has a particular tag. If SAR 20 receives data that lacks the tag or data that has a different tag, the SAR 20 may not collect that data. Note that SAR 20 may be configured to collect data in more than one data stream.

In the illustrated embodiment, SAR 20 is coupled to an SACR 10 and a bus 30. SAR 20 is configured to collect data conveyed over bus 30 if a particular tag is conveyed along with the data that bus cycle. Bus 30 may be a bus internal to an integrated circuit (e.g., a bus internal to a routing IC) that conveys data from one or more input ports of the IC to one or more output ports. In such a configuration, the SAR 20 may be coupled to receive data being conveyed to an output port of the IC. Alternatively, bus 30 may be a bus external to an IC (e.g, a bus that couples several ICs) and SAR 20 may be coupled to receive data being conveyed to an input port of the IC. SAR 20 includes collection enable logic 26, SAR signature storage 24, and SAR collection logic 22. SAR collection logic 22 performs signature collection by combining data conveyed over bus 30 with data stored in signature storage 24 and writing the resulting new signature to signature storage 24. SAR collection logic 22 may perform collection using any suitable collection algorithm (e.g., performing one or more logical XOR operations, each operation operating upon one or more bits conveyed on bus 30 and one or more bits currently stored in signature storage 24).

Collection enable logic 26 receives a start/stop signal from the SACR 10. This start/stop signal controls when the SAR 20 performs signature collection. Collection enable logic 26 receives a tag conveyed on bus 30 (if any) during each bus cycle. Collection enable logic 26 compares the tag on bus 30 to one or more tags identifying data that is to be collected. Each tag includes one or more bits. If the tag on bus 30 is the same as one of the tags identifying data streams to be collected, collection enable logic 26 provides the appropriate value (e.g., an asserted value) of an enable signal to signature collection logic 22. Signature collection logic 22 performs signature collection as described above in response to that value of the enable signal. If the tag conveyed on bus 30 does not match one of the tags identifying data streams to be collected, or if no tag is conveyed on bus 30, then collection enable logic 26 does not provide an enabling value of the enable signal to signature collection logic 24. If signature collection logic 22 does not receive an enabling value of the enable signal, the signature collection logic 22 does not store a new signature in signature storage 24 in response to the data being conveyed on bus 30.

The tag(s) that identify the data streams to be collected may be hardwired into SAR 20 in some embodiments. In other embodiments, such as the illustrated embodiment of FIG. 17, each SAR may be programmed with different tags via the SACR 10. Here, new tag values are programmed into the SACR 10 and the SACR 10 provides the current tag values to the SAR 20.

Accordingly, in some embodiments, each SACR 10 may be programmed with a tag value for a particular data stream, allowing the particular tag that the SAR(s) 20 controlled by that SACR 10 use to collect data to be modified. An SAR 20 may be programmed to capture data in one data stream during one test and another data stream during another test by reprogramming the tag in the SACR 10. Alternatively, the test may be designed so that different data streams may be associated with the same tag during different tests (e.g., tag "01" may be assigned to different data streams during different tests). In some such embodiments, SARs may not be reprogrammed between different tests.

By using tags to differentiate different data streams, deterministic signatures may be collected, despite the presence of a non-deterministic aggregation of data streams.

The tags may include one or more bits. The tags may be conveyed to each SAR 20 on the same bus or other interconnect on which the data, control, and/or address signals collected by that SAR 20 are conveyed. The tags may be conveyed in parallel with the data in some embodiments, as shown in FIG. 17. In other embodiments, the tags may be received by SAR 20 before the associated data, control, and/or address signals are received by SAR 20 (e.g., when a serial interconnect is used to convey the data to the SAR).

Each tag may include several tag fields in some embodiments. Each tag field may identify a property of the data with which the tag is associated. In one embodiment, the tag fields may be hierarchical in that each tag field may identify a property that is more specific than a preceding tag field included in the tag. In some embodiments, one or more ICs within a system may be configured to update one or more tag fields in each tag (e.g., as data is processed by an IC, the IC may update a tag associated with that data).

In some embodiments, the tags may be conveyed each interconnect cycle (e.g., bus arbitration cycle, bus cycle, bit transmission time, or other data and/or time division used to control when data is conveyed over the interconnect) in which it is possible to receive data that is part of a different substream than the data received in the previous time division. For example, if an SAR 20 is configured to monitor a parallel bus, a tag may be conveyed in parallel with the signals collected by that SAR 20 each bus cycle if it is possible for data in different streams to be transmitted on that bus during successive bus cycles. Alternatively, consider a situation in which packets are conveyed on a point-to-point interconnect coupling devices and an SAR is configured to collect data conveyed on the point-to-point interconnect. If each packet takes four clock cycles to be conveyed, a tag may be conveyed on the point-to-point interconnect in the clock cycle before transmission of a new packet begins (e.g., in between successively transmitted packets) instead of being conveyed every clock cycle. The SAR may be configured to enable signature collection for the next four clock cycles in response to the receipt of the appropriate tag (e.g., collection enable logic 26 may provide the enabling value of the enable signal to the signature collection logic 22 for that number of clock cycles). However, note that in some embodiments, tags may also be conveyed more frequently (e.g., tags may be conveyed each clock cycle).

In some embodiments, a tag may be conveyed to the SAR several cycles before the data associated with the tag is received (e.g., during a cycle in which other data that is not associated with the tag is being conveyed on an interconnect, such as a parallel or serial bus or a point-to-point interconnect). For example, if one device generates requests for data in multiple data streams, the requests may each include a tag identifying the requested data stream. For example, the filter units F(0)-F(3) may generate requests for data from the frame buffer 500, and each request may identify a particular data stream (e.g., a particular video stream). The tags in each request may be conveyed to an SAR in a routing unit (e.g., one of scheduling units 400). In response to receiving such a tag, the SAR may be configured to begin collecting data a certain number of interconnect cycles later. For example, upon receiving such a tag, the SAR may begin decrementing a countdown timer. When the countdown timer's value equals a minimum value (e.g., zero), the SAR may begin collecting data. The counter timer's initial value may be selected such that it is equal to the time required for the data requested from the frame buffer 500 to be conveyed to the interconnect monitored by that SAR. Note that in such an embodiment, tags may not be conveyed to the SAR at the same time as the data with which those tags are associated is conveyed to the SAR.

In alternative embodiments in which the tag conveyed to the SAR is included in a data request, the SAR may condition signature collection upon both a tag identifying the data stream and flow control signals being conveyed upon the interconnect monitored by the SAR. For example, if a tag included in a request for data from the frame buffer 500 matches the tag of the data stream that SAR is configured to collect, the SAR may wait for a flow control signal indicating that the requested data is being conveyed or is about to be conveyed on the interconnect. If such a flow control signal is detected, the SAR may collect the associated data. Thus, as the above examples show, tags may be conveyed to an SAR several cycles before the associated data is conveyed to the SAR.

In some embodiments, tags may identify the device that generated or initiated processing of a particular data stream. For example, in the embodiment of FIG. 16, each render pipe may generate a unique tag for the data stream processed by that render pipe. For example, render pipe RP0 may generate a tag '00' and render pipe RP1 may generate a tag '01'. Each render pipe may provide its unique tag to the schedule units 400 each time that render pipe outputs data to one of the schedule units 400. In one embodiment, each render pipe may append its tag to the data transmitted to the schedule units each clock cycle.

The tags may also be used to identify when valid data is present on a bus or other interconnect being monitored by an SAR 20. For example, if valid data is not being transferred in a particular bus cycle, the tags that enable signature capture may not be present on that bus, effectively preventing the invalid (and possibly non-deterministic) data from being captured into the signature. In other embodiments, the bus or other type of interconnect being used to convey data, address, and/or control signals may include an independent valid indication in addition to tags identifying data stream (s).

FIG. 18 shows one embodiment of a method of performing signature analysis. In this embodiment, if a tag identifying a data stream to be collected is received, a signature is updated in response to the data (i.e., the data is collected into the signature), as shown at 1801 and 1803. If the tag is not received, the signature is not updated in response to the data (i.e., the data is not collected), as shown at 1801 and 1805. The tag may be received by a signature analysis register before or at substantially the same time as the associated data. For example, if a serial bus is being used, the tag may be received by the signature analysis register before its associated data is received. If instead a parallel bus is being used, the tag may be received during the same bus cycle as its associated data. Note that in some embodiments (e.g., embodiments in which the tag is conveyed upon a parallel bus during the same bus cycle as the data with which the tag is associated), both the data identified by the tag and the tag may be collected into the signature, while in other embodiments, only the data identified by the tag may be collected into the signature.

Note that while specific embodiments of a method and system for performing signature analysis have been described in the context of a graphics system, similar embodiments may be implemented in other computer systems. Numerous variations and modifications will become apparent to those skilled in the art once the above disclosure is fully appreciated. It is intended that the following claims be interpreted to embrace all such variations and modifications.

What is claimed is:

1. A computer system comprising:
a plurality of integrated circuits;
a routing circuit configured to route a particular data stream with a tag and one or more additional data streams in a non-deterministic aggregate data stream between the plurality of integrated circuits, wherein the routing circuit includes a plurality of ports;
a signature analysis register coupled to one of the plurality of ports;
wherein the signature analysis register is configured to collect a portion of the aggregate data stream conveyed via said one of the plurality of ports, dependent upon whether the signature analysis register receives a tag with said portion identifying said portion as the particular data stream; and
one or more signature analysis control registers;
wherein each signature analysis control register is coupled to one or more signature analysis registers, wherein each signature analysis control register is configured to provide a control tag to each signature analysis register, and wherein each signature analysis register is configured to only collect data whose tag matches the control tag.

2. The computer system of claim 1, wherein a control tag is hardwired into the signature analysis register, and wherein the signature analysis register is configured to only collect data whose tag matches the control tag.

3. The computer system of claim 1, further comprising a plurality of signature analysis registers, wherein each signature analysis register is coupled to a different one of the plurality of ports.

4. The computer system of claim 1, wherein the tag includes a plurality of hierarchical tag fields, wherein each tag field identifies a property of the particular data stream, and wherein each first tag field identifies a less specific property than a second tag field identifies.

5. The computer system of claim 1, wherein one of the plurality of integrated circuits is configured to process the particular data stream and to output the particular data stream to the routing circuit, wherein the one of the plurality of integrated circuits is configured to generate the tag, and wherein the tag identifies the one of the plurality of integrated circuits.

6. A computer system comprising:
a routing unit comprising one or more input ports and one or more output ports, wherein the routing unit is configured to receive a plurality of data streams via the one or more input ports and to convey data included in at least two of the plurality of data streams to at least one of the one or more output ports; and
a signature analysis register coupled to the at least one of the one or more output ports, wherein the signature analysis register is configured to collect data conveyed via the at least one of the one or more output ports for inclusion in a signature stored in the signature analysis register, dependent on whether a tag is conveyed to the signature analysis register within the data collected;
wherein the tag identifies data included in a respective one of the plurality of data streams; and wherein the signature analysis register is coupled to collect data conveyed to the at least one of the one or more output ports on a parallel bus included in the routing unit, and wherein the tag is conveyed on the parallel bus during a same bus cycle as data included in the respective one of the plurality of data streams is conveyed on the parallel bus.

7. The computer system of claim 6, wherein the signature analysis register is further configured to collect data received by the at least one of the one or more output ports for inclusion in the signature, dependent on whether one of a plurality of unique tags is conveyed to the signature analysis register, wherein each of the plurality of unique tags identifies a respective one of the plurality of data streams, and wherein the signature analysis register is configured to collect data in each of the respective ones of the plurality of data streams.

8. The computer system of claim 6, further comprising a signature analysis control register coupled to the signature analysis register, wherein the signature analysis control register is configured to programmably update a value of the tag.

9. The computer system of claim 6, further comprising a plurality of integrated circuits coupled to the routing circuit, wherein each integrated circuit is configured to process data in a respective one of the plurality of data streams.

10. The computer system of claim 9, wherein a tag generator is included in at least one of the plurality of integrated circuits, wherein the tag generator is configured to generate the unique tag.

11. The computer system of claim 6, wherein each data stream of the plurality of data streams is identified by a respective tag, wherein each tag identifies a source of a respective one of the plurality of data streams.

12. The computer system of claim 6, wherein the signature analysis register is alternatively coupled to collect data conveyed to the at least one of the one or more output ports on a serial bus, and wherein the tag is conveyed to the signature analysis register in an earlier bus cycle preceding a later bus cycle in which data included in the respective one of the plurality of data streams is conveyed to the signature analysis register.

13. The computer system of claim 6, wherein the tag includes more than one bit.

14. The computer system of claim 6, wherein the tag includes a plurality of hierarchical tag fields, wherein each tag field identifies a property of the one of the plurality of data streams, and wherein each first tag field identifies a less specific property than a second tag field identifies.

15. A method comprising:
routing a plurality of data streams from a plurality of input ports to at least one output port, wherein at least one data stream of the plurality of data streams includes a tag, and wherein a non-deterministic aggregate of the plurality of data streams is routed to the at least one output port;
collecting data conveyed via one of the at least one output port for inclusion in a signature, dependent on whether the tag identifying said one data stream of the plurality of data streams is received with the data collected;
a signature analysis control register providing a control tag to a signature analysis register configured to perform said collecting; and
the signature analysis register collecting only data included in one of the plurality of data streams whose tag matches the control tag, wherein the tag identifying data included in one of the plurality of data streams matches the control tag.

16. The method of claim 15, further comprising the signature analysis control register storing the control tag and programmably updating a value of the control tag.

17. The method of claim 15, wherein said collecting comprises creating a signature value dependent on an order in which collected data is conveyed on the interconnect.

18. The method of claim 15, wherein the tag includes more than one bit.

19. The method of claim 15, wherein the tag includes a plurality of hierarchical tag fields, wherein each tag field identifies a property of the one of the plurality of data streams, and wherein each first tag field identifies a less specific property than a second tag field identifies.

20. A computer system comprising:
a routing unit comprising one or more input ports and one or more output ports, wherein the routing unit is configured to receive a plurality of data streams via the one or more input ports and to convey data included in at least two of the plurality of data streams to at least one of the one or more output ports; and
a signature analysis register coupled to the at least one of the one or more output ports, wherein the signature analysis register is configured to collect data conveyed via the at least one of the one or more output ports for inclusion in a signature stored in the signature analysis register, dependent on whether a tag is conveyed to the signature analysis register within the data collected;
wherein the tag identifies data included in a respective one of the plurality of data streams; and
wherein the signature analysis register is further configured to collect data received by the at least one of the one or more output ports for inclusion in the signature, dependent on whether one of a plurality of unique tags is conveyed to the signature analysis register, wherein each of the plurality of unique tags identifies a respective one of the plurality of data streams, and wherein the signature analysis register is configured to collect data in each of the respective ones of the plurality of data streams.

21. A computer system comprising:
a routing unit comprising one or more input ports and one or more output ports, wherein the routing unit is configured to receive a plurality of data streams via the one or more input ports and to convey data included in at least two of the plurality of data streams to at least one of the one or more output ports; and
a signature analysis register coupled to the at least one of the one or more output ports, wherein the signature analysis register is configured to collect data conveyed via the at least one of the one or more output ports for inclusion in a signature stored in the signature analysis register, dependent on whether a tag is conveyed to the signature analysis register within the data collected;
wherein the tag identifies data included in a respective one of the plurality of data streams; and
wherein the signature analysis register is coupled to collect data conveyed to the at least one of the one or more output ports on a serial bus, and wherein the tag is conveyed to the signature analysis register in an earlier bus cycle preceding a later bus cycle in which data included in the respective one of the plurality of data streams is conveyed to the signature analysis register.

22. A computer system comprising:
a plurality of integrated circuits;
a routing circuit configured to route a particular data stream with a tag and one or more additional data streams in a non-deterministic aggregate data stream between the plurality of integrated circuits, wherein the routing circuit includes a plurality of ports; and
a signature analysis register coupled to one of the plurality of ports;
wherein the signature analysis register is configured to collect a portion of the aggregate data stream conveyed via said one of the plurality of ports, dependent upon whether the signature analysis register receives a tag with said portion identifying said portion as the particular data stream; and
wherein the tag includes a plurality of hierarchical tag fields, wherein each tag field identifies a property of the particular data stream, and wherein each first tag field identifies a less specific property than a second tag field identifies.

23. A method comprising:
routing a plurality of data streams from a plurality of input ports to at least one output port, wherein at least one data stream of the plurality of data streams includes a tag, and wherein a non-deterministic aggregate of the plurality of data streams is routed to the at least one output port; and
collecting data conveyed via one of the at least one output port for inclusion in a signature, dependent on whether the tag identifying said one data stream of the plurality of data streams is received with the data collected;
wherein the tag includes a plurality of hierarchical tag fields, wherein each tag field identifies a property of said one data stream of the plurality of data streams, and wherein each first tag field identifies a less specific property than a second tag field identifies.

* * * * *